(12) United States Patent
Raju et al.

(10) Patent No.: US 11,644,320 B2
(45) Date of Patent: May 9, 2023

(54) INTERSECTION-BASED ROUTING

(71) Applicant: Uber Technologies, Inc., San Francisco, CA (US)

(72) Inventors: Kanchanapalli Muralidhar Raju, Telangana (IN); Karapet Shaginyan, San Francisco, CA (US); Jane Alam Jan, Cupertino, CA (US)

(73) Assignee: Uber Technologies, Inc., San Francisco, CA (US)

( * ) Notice: Subject to any disclaimer, the term of this patent is extended or adjusted under 35 U.S.C. 154(b) by 93 days.

(21) Appl. No.: 16/911,823

(22) Filed: Jun. 25, 2020

(65) Prior Publication Data
US 2020/0408538 A1    Dec. 31, 2020

Related U.S. Application Data

(60) Provisional application No. 62/866,335, filed on Jun. 25, 2019.

(51) Int. Cl.
*G01C 21/34* (2006.01)
*G01C 21/36* (2006.01)

(52) U.S. Cl.
CPC ....... *G01C 21/343* (2013.01); *G01C 21/3415* (2013.01); *G01C 21/3453* (2013.01); *G01C 21/3605* (2013.01); *G01C 21/3661* (2013.01); *G01C 21/3691* (2013.01)

(58) Field of Classification Search
CPC .............. G01C 21/343; G01C 21/3605; G01C 21/3661; G01C 21/3415; G01C 21/3691; G01C 21/3453; G01C 21/3676; G01C 21/3438; G08G 1/20–207; G08G 1/0968–1/0969
See application file for complete search history.

(56) References Cited

U.S. PATENT DOCUMENTS

| | | | |
|---|---|---|---|
| 6,581,001 B1 * | 6/2003 | Katsuka ............. | G01C 21/3626 340/994 |
| 9,769,616 B1 * | 9/2017 | Pao ........................ | H04W 4/023 |
| 10,520,941 B2 * | 12/2019 | Herbach ................ | G06Q 50/30 |

(Continued)

FOREIGN PATENT DOCUMENTS

JP         H10227649        *  8/1998

*Primary Examiner* — Jeffrey C Boomer
(74) *Attorney, Agent, or Firm* — Schwegman Lundberg & Woessner, P.A.

(57) ABSTRACT

Systems and methods are provided for receiving a start location and a destination location, determining a road segment corresponding to the destination location, and identifying a node nearest the road segment corresponding to the destination location, whereby the node corresponds to a nearest left-hand node for a right-hand driving country or a nearest right-hand node for a left-hand driving country. The systems and methods further provide for generating a first route from the start location to the node nearest the road segment corresponding to the destination location, generating a second route from the node nearest the road segment corresponding to the destination location, to the destination location, and combining the first route and the second route to generate a final route. Thus, the final route comprises a route from the start location, through the node nearest the road segment corresponding to the destination location, to the destination location.

19 Claims, 21 Drawing Sheets

(56) References Cited

U.S. PATENT DOCUMENTS

| | | | |
|---|---|---|---|
| 10,988,137 B2* | 4/2021 | Dyer | G05D 1/0088 |
| 2015/0112585 A1* | 4/2015 | Knepper | G01C 21/3697 |
| | | | 701/410 |
| 2016/0247113 A1* | 8/2016 | Rademaker | G06Q 10/083 |
| 2017/0314939 A1* | 11/2017 | Carter | G01C 21/3492 |
| 2018/0112994 A1* | 4/2018 | Fujikawa | G01C 21/3415 |
| 2020/0333149 A1* | 10/2020 | Iwata | G01C 21/3446 |

* cited by examiner

INTERSECTION-BASED ROUTING

BACKGROUND

A user needing a ride may be waiting to be picked up by a vehicle (e.g., via a ride-sharing service, a taxi company, or the like) on one side of the road while the vehicle for the ride may be on the other side of the road. It may be difficult or dangerous to cross the street to the vehicle due to traffic, physical barriers, or lack of a crosswalk.

BRIEF DESCRIPTION OF THE DRAWINGS

Various ones of the appended drawings merely illustrate example embodiments of the present disclosure and should not be considered as limiting its scope.

DETAILED DESCRIPTION

Figure 2:
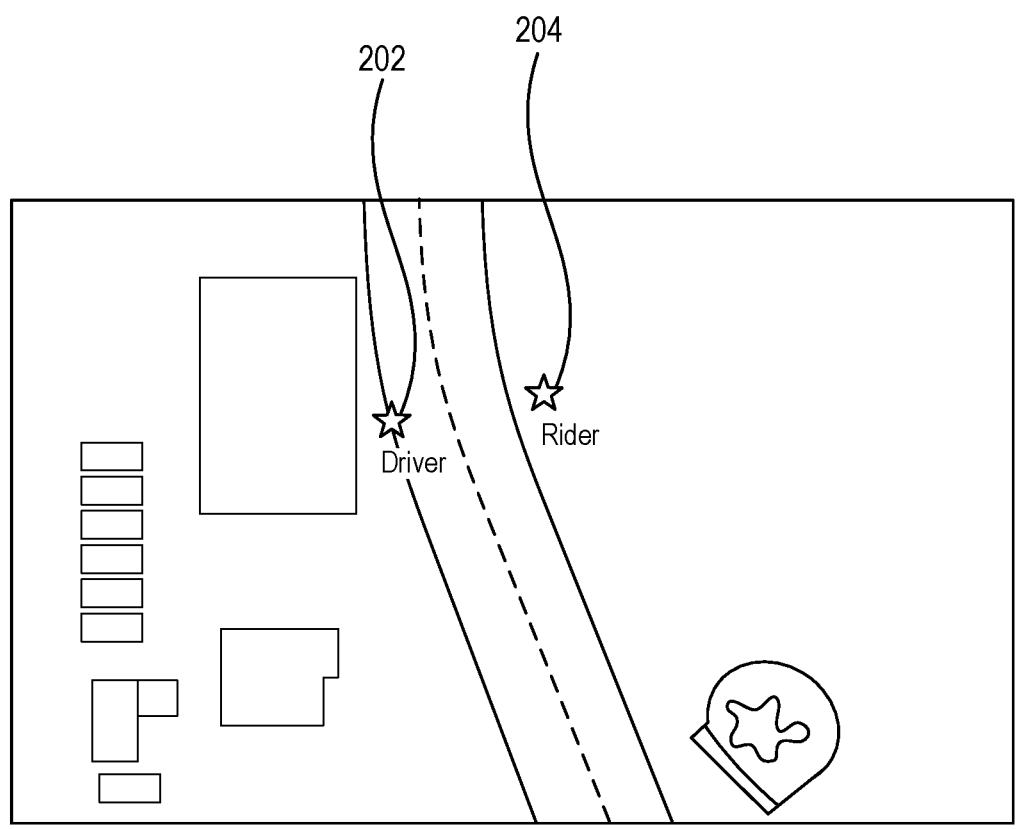
FIG. 2 illustrates an example map showing a location of a driver and a location of a rider on opposite sides of a road, according to some example embodiments.

Systems and methods described herein relate to a nearest node or intersection-based routing system. As explained above, a user needing a ride may be waiting to be picked up by a vehicle (e.g., via a ride-sharing service, a taxi company, a personal vehicle, or the like) on one side of the road while the vehicle for the ride may be on the other side of the road. It may be difficult or dangerous to cross the street to the vehicle due to traffic, physical barriers, or lack of a crosswalk. FIG. 2 illustrates an example map 200 that shows a location of a driver 202 and a location of a rider 204. As can be seen, the driver 202 and the rider 204 are on opposite sides of a large and busy road that has a physical median in between the two sides of the road and no indication of any crosswalk.

Figure 3:
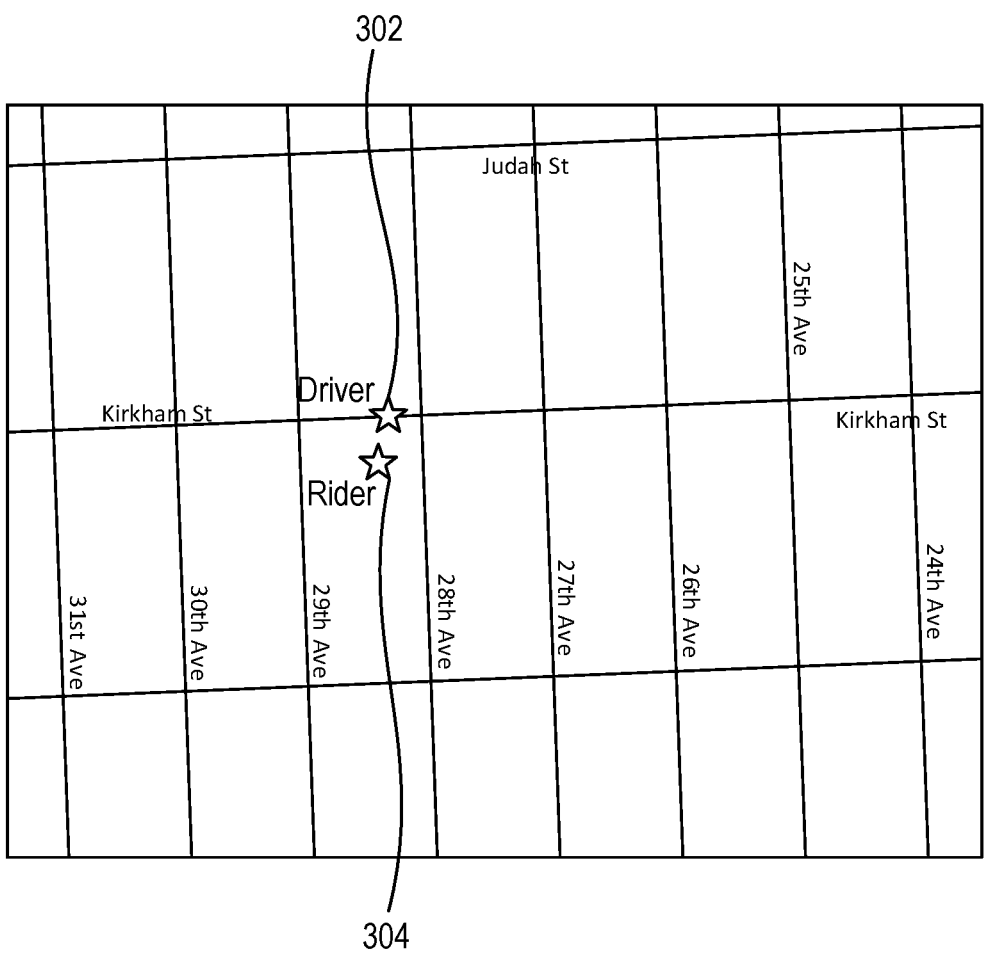
FIG. 3 illustrates an example map showing a location of a driver and a location of a rider, according to some example embodiments.

Moreover, when looking at a map in existing navigation systems it is hard to determine if the driver is on the same side as a rider or not. FIG. 3 illustrates an example map 300 that shows a location of a driver 302 and a location of a rider 304 on Kirkham St. It cannot be determined, however, if the driver 302 is on the same side of the street as the rider 304.

Example embodiments provide a nearest node or intersection-based routing system to ensure that a driver will be on the correct side of the street so that the rider can get into the vehicle from the sidewalk instead of crossing a street or having to go around the vehicle to get into the vehicle. Example embodiments take into account whether the rider and driver are in a right-hand driving country or a left-hand driving country to ensure the door opens towards the rider for easy step-in. Accordingly, example embodiments reduce contact between a driver and a rider (e.g., a need to call or message each other to figure out where each is located on the street), reduce the risk of accidents, reduce illegal road crossing, and increase ease of use for riders and drivers, resulting in increasing the rider and driver satisfaction rate.

Example use cases described herein include navigation and ride-sharing services. It is to be understood that these are example use cases and that example embodiments may be used in other embodiments where arriving on a particular side of a street is desired.

Figure 1:
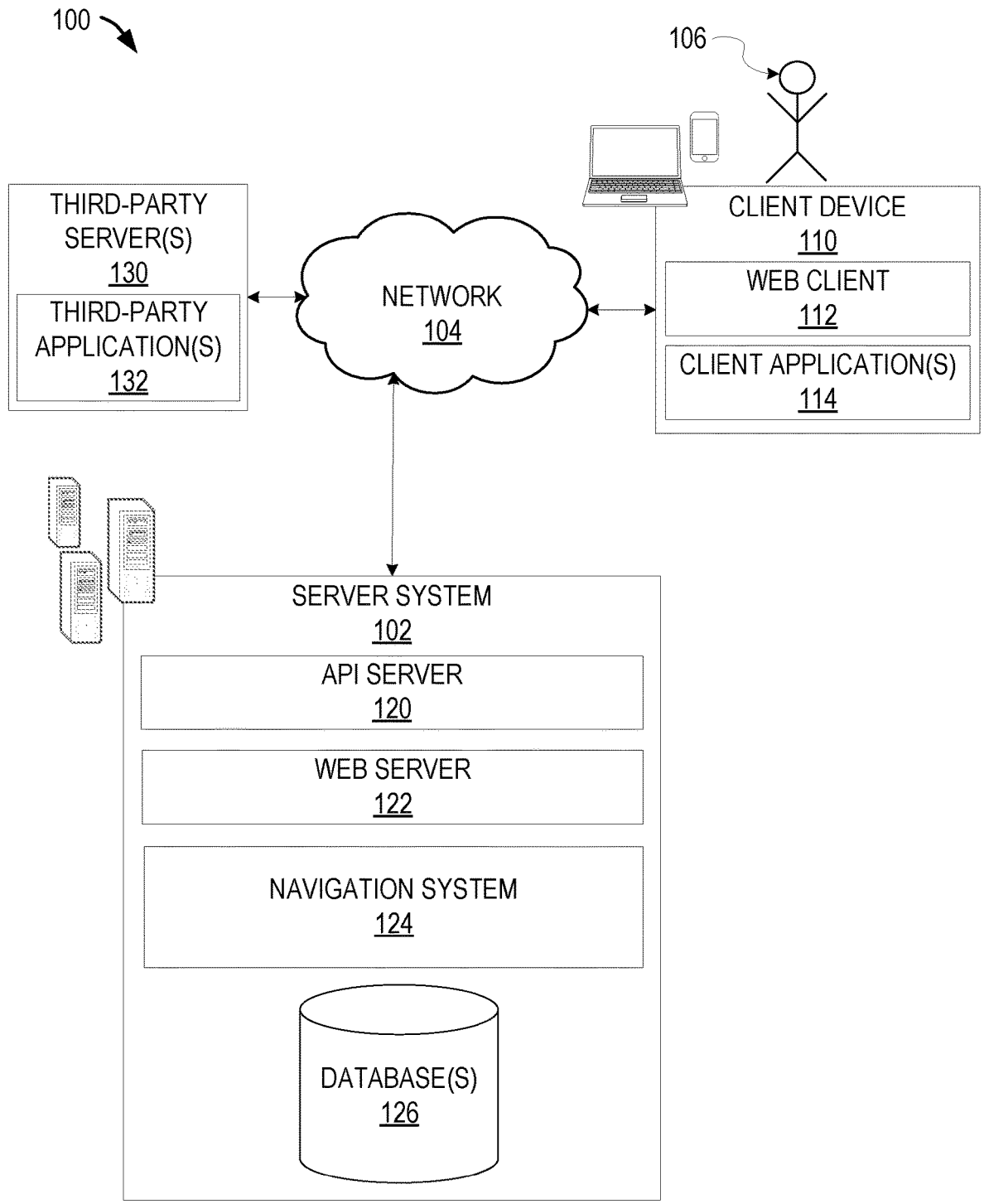
FIG. 1 is a block diagram illustrating a networked system, according to some example embodiments.

FIG. 1 is a block diagram illustrating a networked system 100, according to some example embodiments. The system 100 includes one or more client devices such as client device 110. The client device 110 may comprise, but is not limited to, a mobile phone, desktop computer, laptop, portable digital assistant (PDA), smart phone, tablet, ultrabook, netbook, laptop, multi-processor system, microprocessor-based or programmable consumer electronic, game console, set-top box, computer in a vehicle, or any other communication device that a user may utilize to access the networked system 100. In some embodiments, the client device 110 may comprise a display module (not shown) to display information (e.g., in the form of user interfaces). In further embodiments, the client device 110 may comprise one or more of touchscreens, accelerometers, gyroscopes, cameras, microphones, Global Positioning System (GPS) devices, and so forth. The client device 110 may be a device of a user that is used to request map information, provide map information, request navigation information, receive and display results of map and/or navigation information, request data about a place or entity in a particular location, receive and display data about a place or entity in a particular location, receive and display data about a pickup or drop-off location, receive and display data related to navigation to a pickup or drop-off location, and so forth.

One or more users 106 may be a person, a machine, or other means of interacting with the client device 110. In example embodiments, the user 106 is not part of the system 100 but interacts with the system 100 via the client device 110 or other means. For instance, the user 106 provides input (e.g., touchscreen input or alphanumeric input) to the client device 110 and the input may be communicated to other entities in the system 100 (e.g., third-party servers 130, server system 102) via a network 104. In this instance, the other entities in the system 100, in response to receiving the input from the user 106, communicate information to the client device 110 via the network 104 to be presented to the user 106. In this way, the user 106 interacts with the various entities in the system 100 using the client device 110. In some example embodiments, the user 106 is a rider in a ride-sharing service, a driver in a ride-sharing service, a person desiring information about a rider pick-up location, or the like.

The system 100 further includes the network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WIFI network, a WiMax network, another type of network, or a combination of two or more such networks.

The client device 110 accesses the various data and applications provided by other entities in the system 100 via a web client 112 (e.g., a browser, such as the Internet Explorer® browser developed by Microsoft® Corporation of Redmond, Wash. State) or one or more client applications 114. The client device 110 includes the one or more client applications 114 (also referred to as "apps") such as, but not limited to, a web browser, a messaging application, an electronic mail (email) application, an e-commerce site application, a mapping or location application, a ride-sharing application, a navigation application, and the like.

In some embodiments, the one or more client applications 114 may be included in the client device 110, and configured to locally provide a user interface and at least some of the functionalities, with the client applications 114 configured to communicate with other components or entities in the system 100 (e.g., third-party servers 130, server system 102), on an as-needed basis, for data and/or processing capabilities not locally available (e.g., to access location information, to request a pickup or drop-off location, to access navigation information, to authenticate the user 106, to verify a method of payment). Conversely, the one or more client applications 114 may not be included in the client device 110, and the client device 110 may use its web browser to access the one or more applications hosted on other entities in the system 100 (e.g., third-party servers 130, server system 102).

The server system 102 provides server-side functionality via the network 104 (e.g., the Internet or a wide area network (WAN)) to one or more third-party servers 130 and/or one or more client devices 110. The server system 102 may include an application programming interface (API) server 120, a web server 122, and a navigation system 124, that are communicatively coupled with one or more databases 126.

The one or more databases 126 are storage devices that store data related to one or more of source code, navigation data, pick-up and drop-off locations, a nearest node to a destination location, and so forth. The one or more databases 126 may further store information related to the third-party servers 130, third-party applications 132, the client device 110, the client applications 114, the user 106, and so forth. The one or more databases 126 may be cloud-based storage.

The server system 102 is a cloud computing environment, according to some example embodiments. The server system 102, and any servers associated with the server system 102, are associated with a cloud-based application, in one example embodiment.

The navigation system 124 provides back-end support for the third-party applications 132 and the client applications 114, which may include cloud-based applications. The navigation system 124 generates a route to position a vehicle on the same side of the street as a user desiring a ride in the vehicle, and so forth, as described in further detail below. The navigation system 124 comprises one or more servers or other computing devices or systems.

The system 100 further includes one or more third-party servers 130. The one or more third-party servers 130 comprise one or more third-party applications 132. The one or more third-party applications 132, executing on the third-party server(s) 130, interact with the server system 102 via a programmatic interface provided by the API server 120. For example, the one or more third-party applications 132 may request and utilize information from the server system 102 via the API server 120 to support one or more features or functions on a website hosted by a third party or an application hosted by the third party. In one example, a third-party application 132 may request and receive navigation data via the server system 102 and the navigation system 124.

Figure 4:
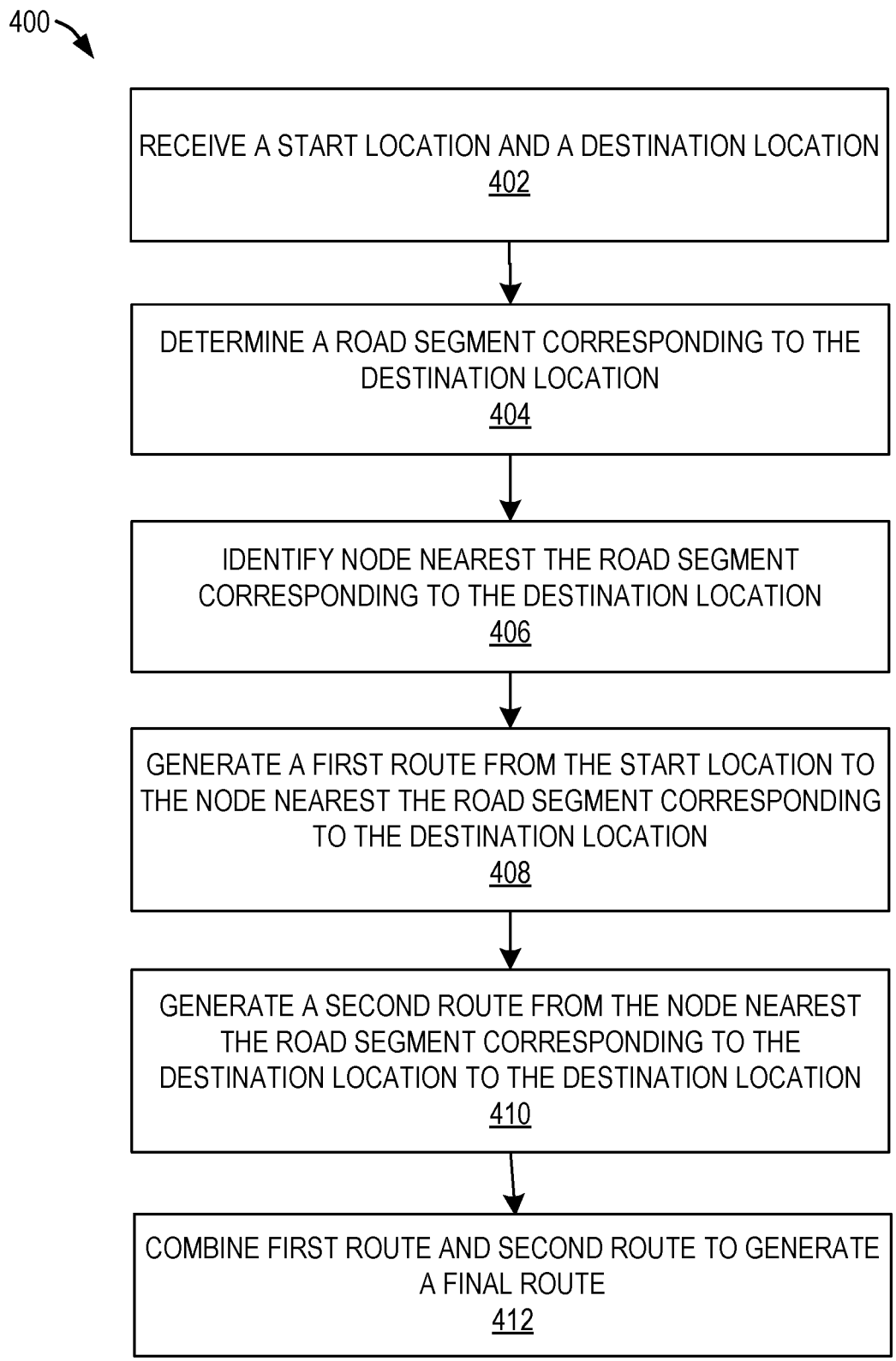
FIG. 4 is a flowchart illustrating aspects of a method, according to some example embodiments.

FIG. 4 is a flowchart illustrating aspects of a method 400 for generating a route to position a vehicle on the same side of the street as a user desiring a ride in the vehicle, according to some example embodiments. For illustrative purposes, the method 400 is described with respect to the networked system 100 of FIG. 1. It is to be understood that the method 400 may be practiced with other system configurations in other embodiments.

In operation 402, one or more processors of a computing system (e.g., a server system, such as the server system 102 or the navigation system 124) receive a start location and a destination location. For example, the computing system receives the start location and destination location from one or more client devices 110 as part of a request for navigational instructions from the start location to the destination location. The start location and the destination location may comprise at least one of latitude and longitude coordinates, an address, a place name, a landmark, a building name, a building footprint, an access point, a hotspot, a point of interest, a pickup point, a drop-off point, or the like.

In one example, the start location is a driver location and the destination location is a rider location. In another example, the destination location is a rider drop-off location. For example, a user who needs a ride (e.g., a rider) may request a ride through a ride-sharing service, request a ride through a taxi or cab service, ask another person (e.g., friend, family, co-worker, etc.) to pick her or him up, or the like. The rider can provide the destination location (e.g., rider pickup location and/or rider drop-off location) via his or her computing device (e.g., the client device 110), or a driver can provide the destination location via his or her computing device. The driver location can also be provided by the driver's computing device. The rider's and/or the driver's computing device(s) send(s) the start location and/or the destination location to the computing system. The following description uses the example that the destination location is a rider (pickup) location. It is to be understood that example embodiments also apply to the scenario where the destination location is a rider drop-off location to ensure a rider is dropped off on the same side as the drop-off location (e.g., house, restaurant, park).

In operation 404, the computing system determines a road segment corresponding to the destination location. For example, the computing system can use a typical mapping topology to identify a road segment corresponding to the latitude/longitude coordinates, address, or the like of the destination location. Some example technologies that can be used to determine a road segment include Normal (e.g., drawing a perpendicular line and identifying the nearest road segment, for example, the shortest perpendicular line is the nearest road segment), Nearest Neighbor Algorithm, and the like.

In one example, the computing system uses the latitude and longitude coordinates of the destination location to draw a normal (e.g., a perpendicular line) to the road segment to indicate the shortest distance from the destination location (e.g., pickup point) to the nearest road. The latitude and longitude coordinates for the location where the normal hits the road can be used to determine the road segment for the destination location. In one example, the normal is stored for a particular location so that it can be used in the future for the particular location without having to re-calculate the normal.

In operation 406, the computing system identifies a node nearest the road segment corresponding to the destination location. For example, the computing device identifies a nearest left-hand node for a right-hand driving country and a nearest right-hand node for a left-hand driving country. Using the nearest left-hand node or right-hand node ensures that a rider and a driver will be on the same side of a road for picking up the rider. The determination of "left-hand" node or "right-hand" node is relative to the rider location. For example, a left-hand node is a nearest intersection, for example, to the left of the rider when he or she is standing on or facing a street, and a right-hand node is a nearest intersection, for example, to the right of the rider when he or she is standing on or facing the street. This also applies when the destination location is a drop-off location, using the landmark (e.g., house, restaurant, park) facing the street.

In one example, the left and/or right node can be identified using latitude and longitude values to determine which is a node to the left of a rider and which is a node to the right of a rider. In another example, cardinal directions (North, East, South, West), Map Topology algorithms, or the like, can be used to determine the left and/or right node.

The node nearest the road segment corresponding to the destination location can be an intersection, a U-turn point between intersections, a dead end, a cul-de-sac, a T junction, a crossroad, a Y junction, a roundabout, a slip road, a braided road, or the like. In one example embodiment, the node nearest the road segment corresponding to the destination location is a nearest left-hand intersection for a right-hand driving country or a nearest right-hand intersection for a left-hand driving country, to ensure that the rider and driver will be on the same side of the road for pickup (or as the landmark for a drop-off location).

In one example, the computing system builds a spatial relationship between the destination location road segment and the node nearest the road segment and stores the spatial relationship (e.g., in one or more databases 126). In this way, the next time the road segment is identified, the computing system can use the stored node for the destination location instead of calculating a road segment and node nearest the road segment anew. For example, the computing system accesses the one or more databases 126 to retrieve the node corresponding to the destination location or the road segment (wherein the node is the node nearest the road segment). This can save significant computational resources, particularly for a common destination (e.g., pickup) location. For example, if many users desire to be picked up at an airport, the computing system can store the nearest node for the location and retrieve the nearest node to the road segment for the airport for each user.

Figure 5:
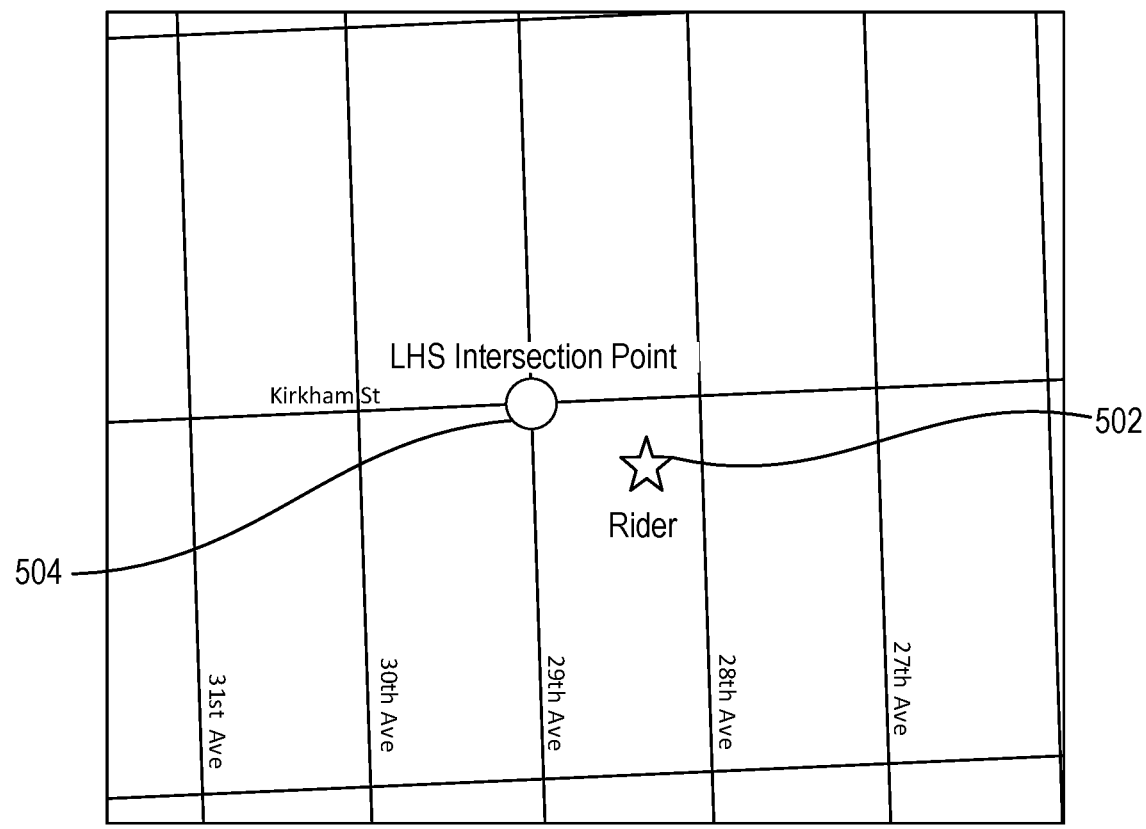
FIGS. 5-9 each represent an example map illustrating an example route to a destination location, according to some example embodiments.

FIGS. 5-10 illustrate a right-hand driving country scenario (e.g., where the driver location in the vehicle is typically on the left-hand side of the vehicle and vehicles drive on the right-hand side of the road). FIG. 5 illustrates an example map 500 showing a rider (e.g., destination) location 502 and a nearest node 504 comprising a nearest left-hand intersection point. The determination of "left-hand" is relative to the rider location. In the example in FIG. 5, the rider or destination location 502 is located on Kirkham St with 29th Ave to the left of the rider location and 28th Ave to the right of the rider location. For instance, if the top of the map in FIG. 5 is north, the rider is on the south side of Kirkham St.

Figure 6:
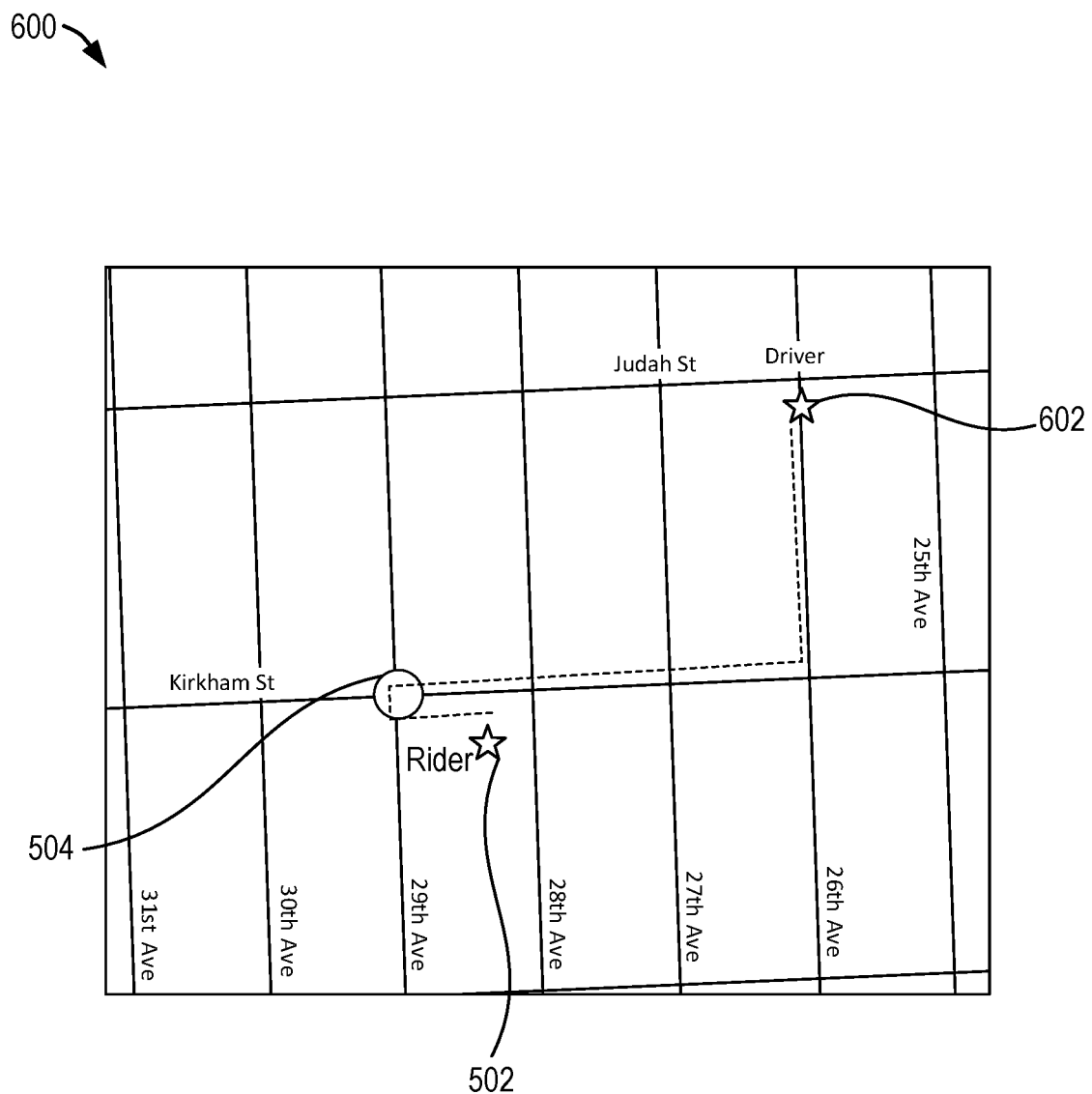
Figure 7:
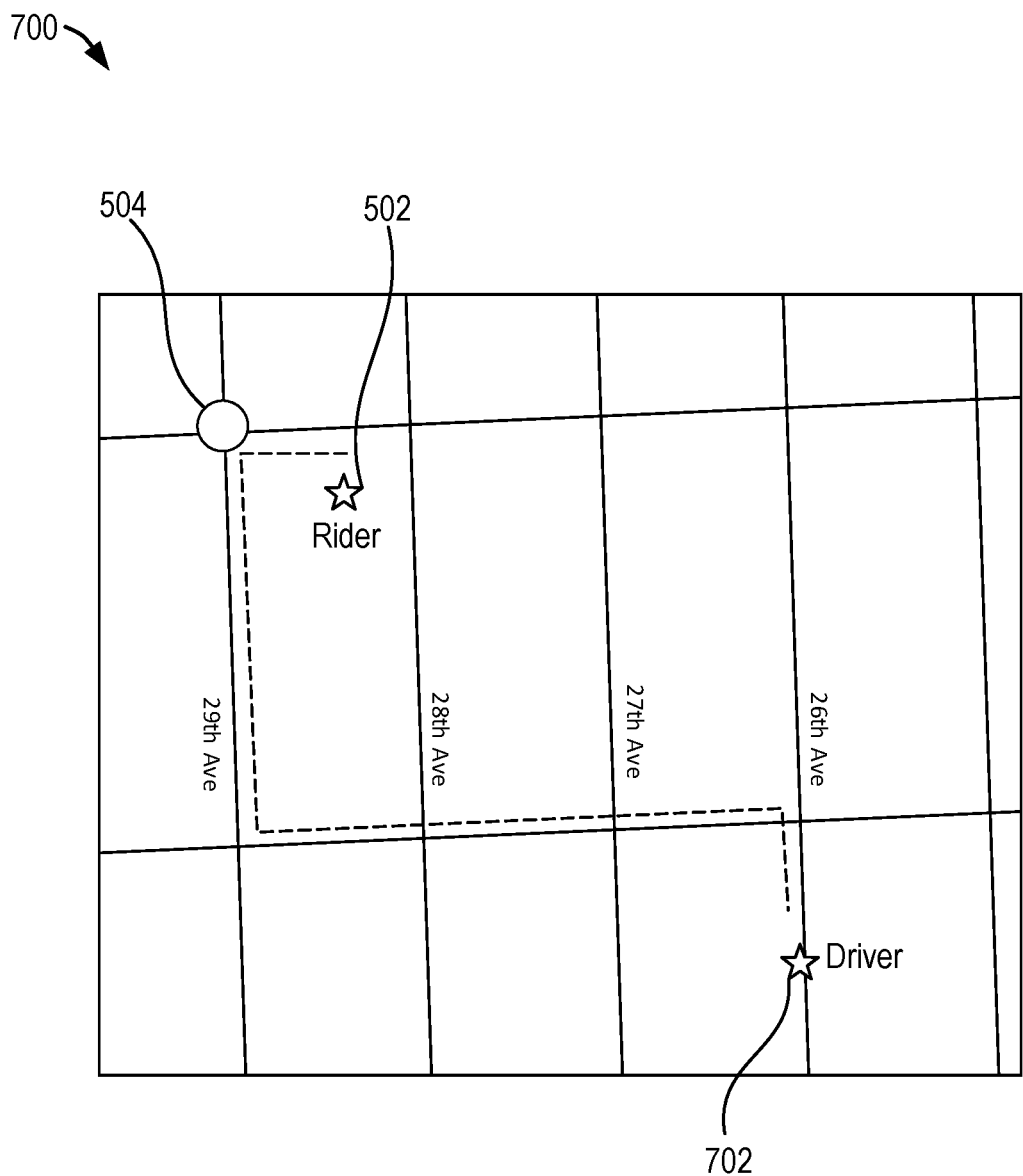
Figure 8:
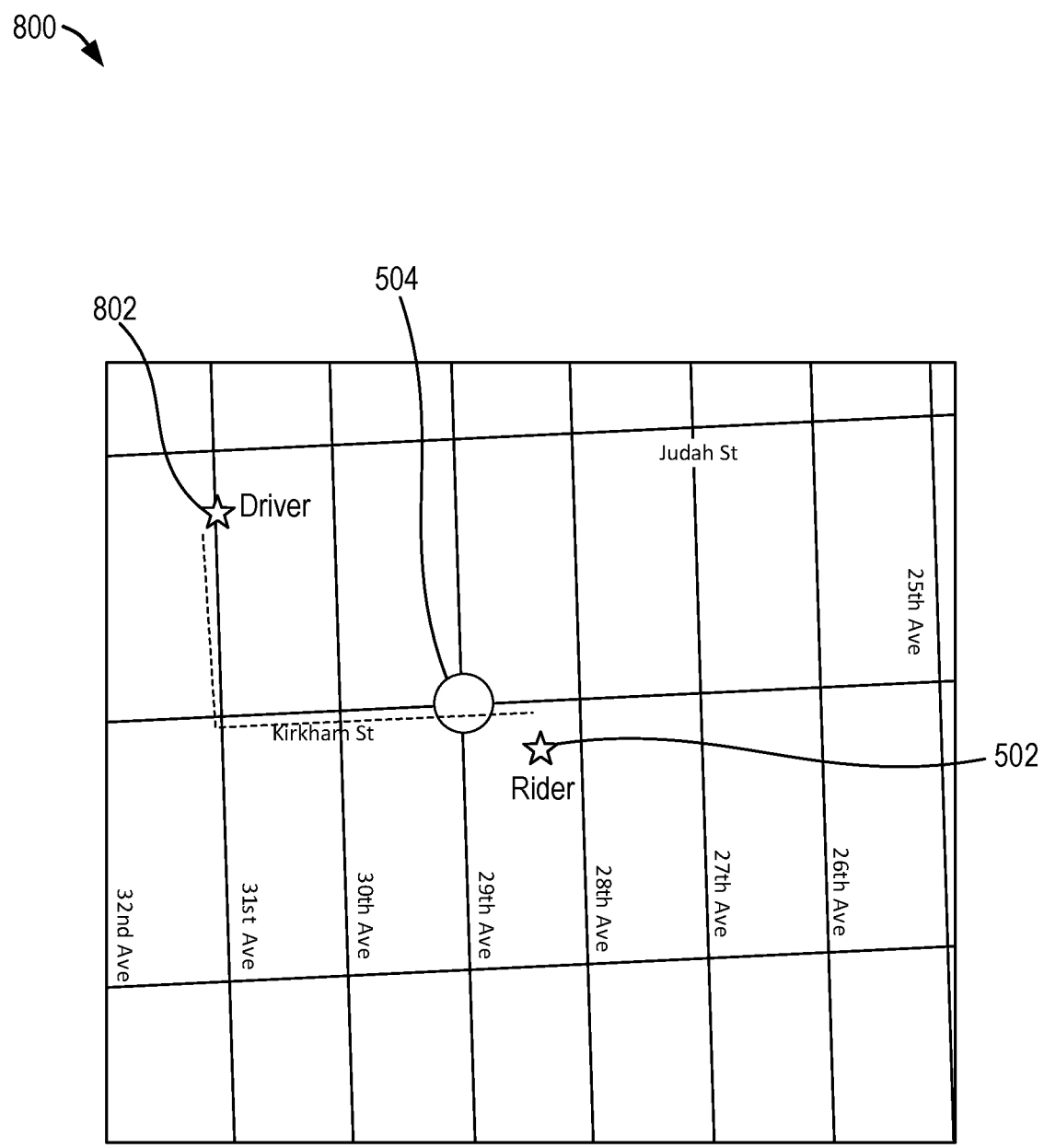
Figure 9:
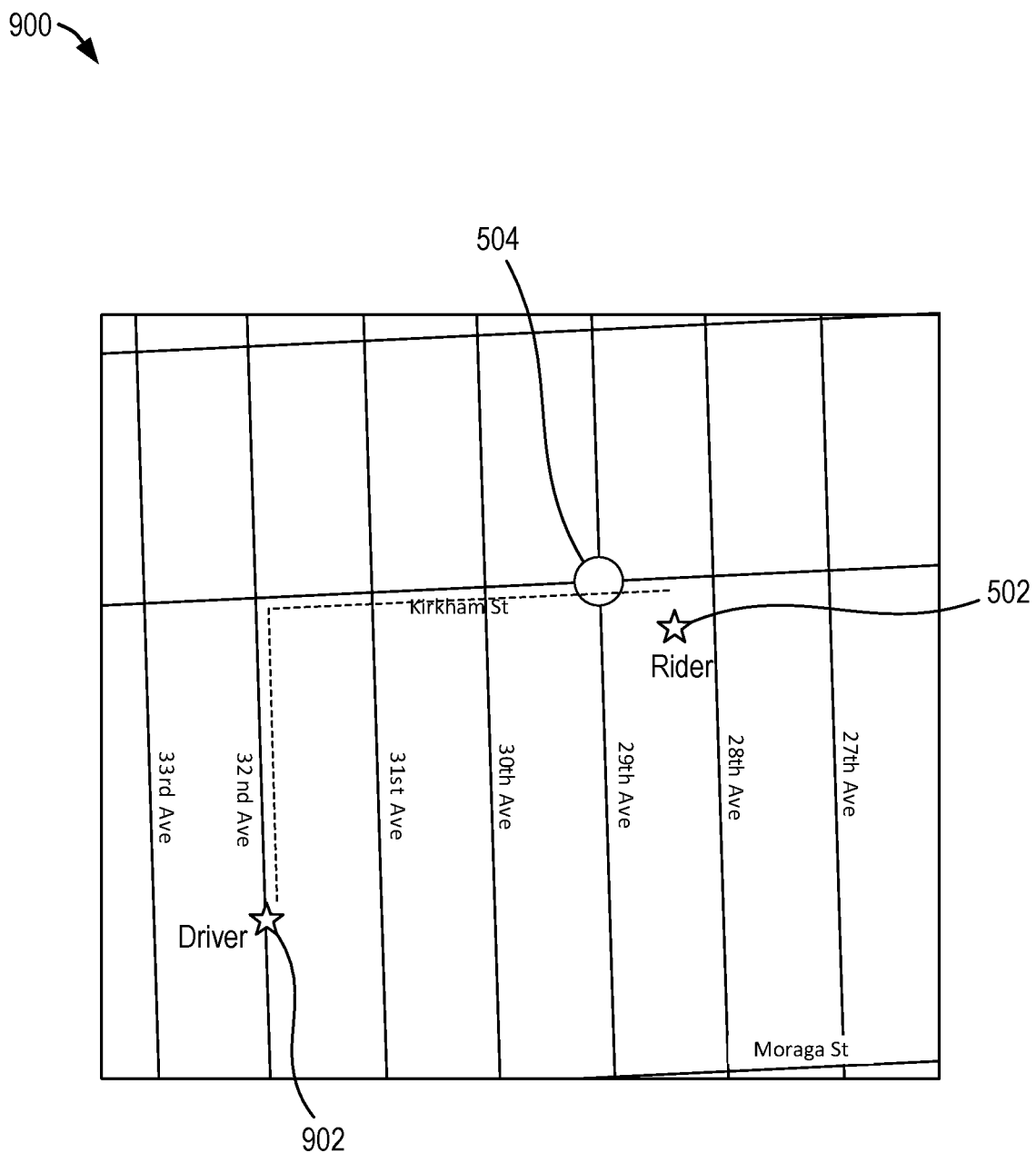
Figure 10:
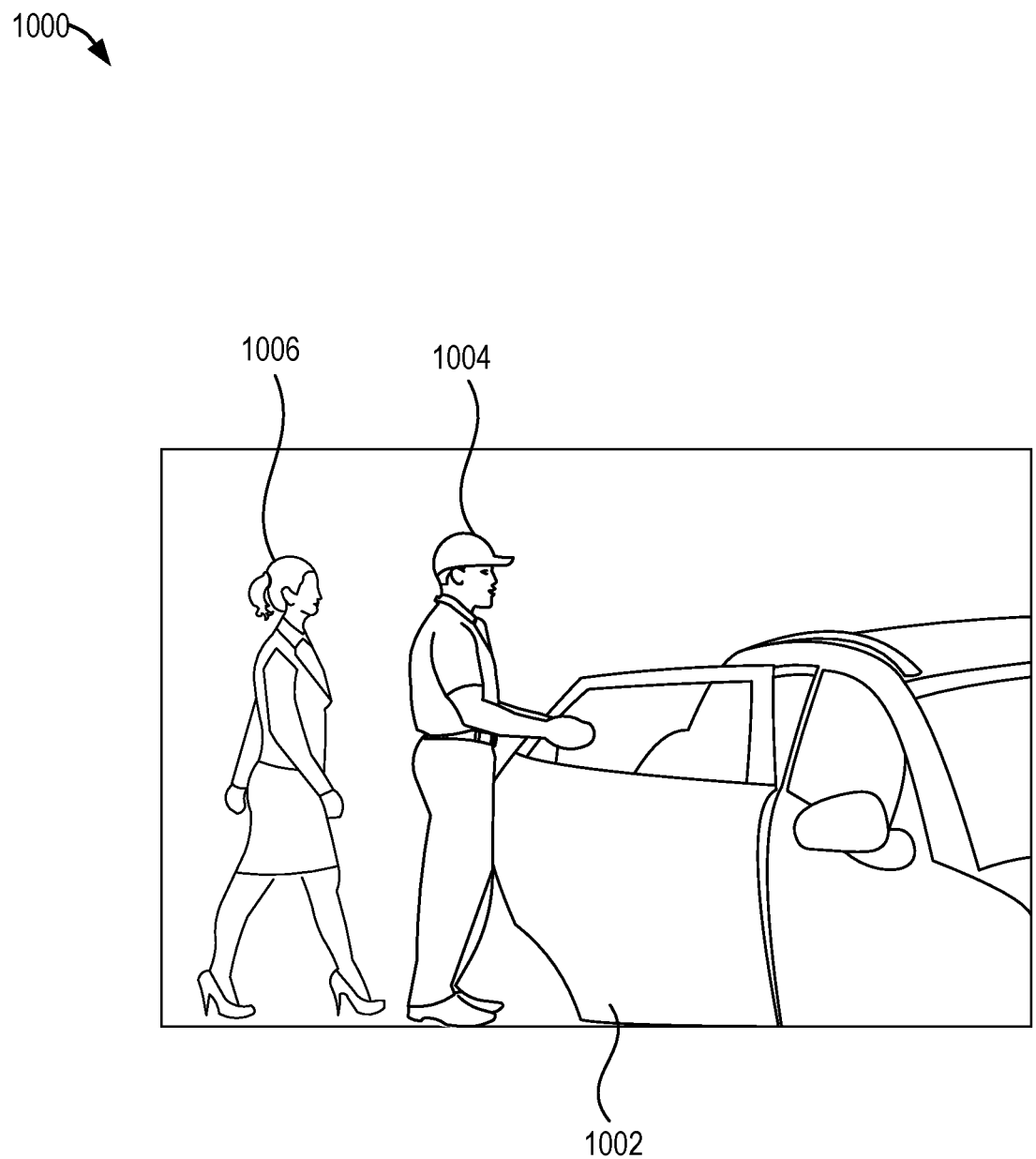
FIG. 10 illustrates an example scenario where a passenger door is opening on the side of the street where a rider can enter the vehicle, according to some example embodiments.

In the example shown in FIG. 5, there are several possible ways for a driver to reach the rider or destination location 502. Irrespective of driver location, if a driver is directed via the nearest node 504 (e.g., left-hand intersection point) linked to the rider or destination location 502, the driver will arrive on the correct side of the street to pick up the rider safely. For example, FIGS. 6-9 show each of four possible routes by which the driver may be directed through the left-hand intersection point 504. FIG. 6 shows an example map 600 showing a start or driver location 602 where the driver is routed via the nearest node 504 (e.g., left-hand intersection point) to make a U-turn to arrive on the correct side of the street for the rider or destination location 502. FIG. 7 shows another example map 700 showing a start or driver location 702 where the driver is routed via the nearest node 504 (e.g., left-hand intersection point) to arrive on the correct side of the street for the rider or destination location 502. FIG. 8 illustrates a further example map 800 showing a start or driver location 802 where the driver is routed via the nearest node 504 (e.g., left-hand intersection point) to arrive on the correct side of the street for the rider or destination location 502. FIG. 9 shows another example map 900 showing a start or driver location 902 where the driver is routed via the nearest node 504 (e.g., left-hand intersection point) to arrive on the correct side of the street for the rider or destination location 502. All the scenarios in FIGS. 6-9 result in the passenger's door opening on the correct side of the street for the rider to enter the vehicle, as shown in FIG. 10. FIG. 10 illustrates an example 1000 where a passenger door 1002 is opening on the side of the street where the rider (a rider 1004 and a rider 1006 in this example) can enter the vehicle.

Figure 11:
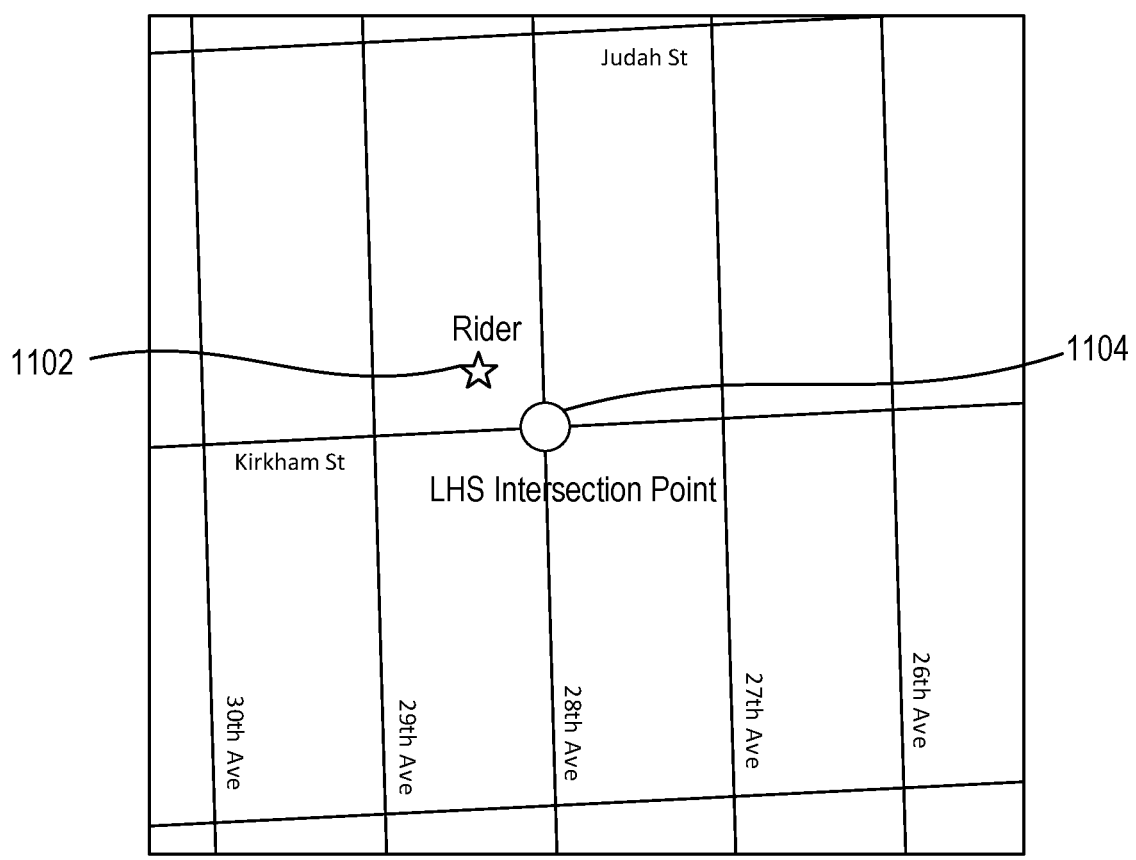
FIGS. 11-19 each represent an example map illustrating an example route to a destination location, according to some example embodiments.

FIGS. 11-15 also illustrate a right-hand driving country scenario (e.g., where the driver location in the vehicle is typically on the left-hand side of the vehicle and vehicles drive on the right-hand side of the road), but where the rider is on the other side of the street (e.g., Kirkham St.). FIG. 11 illustrates an example map 1100 showing a rider (e.g., destination) location 1102 and a nearest node 1104 comprising a nearest left-hand intersection point. The determination of "left-hand" is relative to the rider location. In the example in FIG. 11, the rider or destination location 1102 is located on the other side of Kirkham St., and thus, 29th Ave. is to the right of the rider and 28th Ave. is to the left of the rider.

Figure 12:
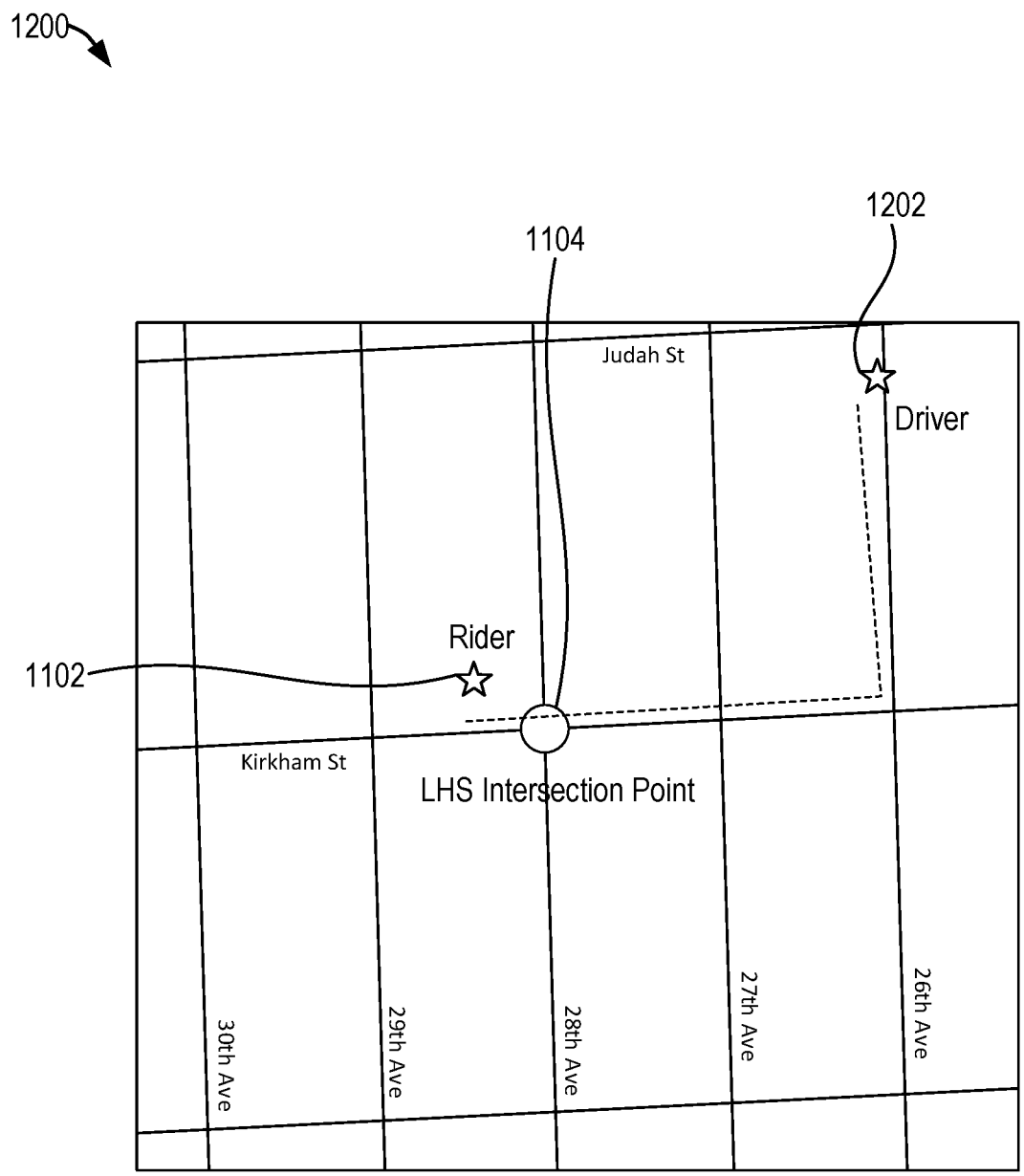
Figure 13:
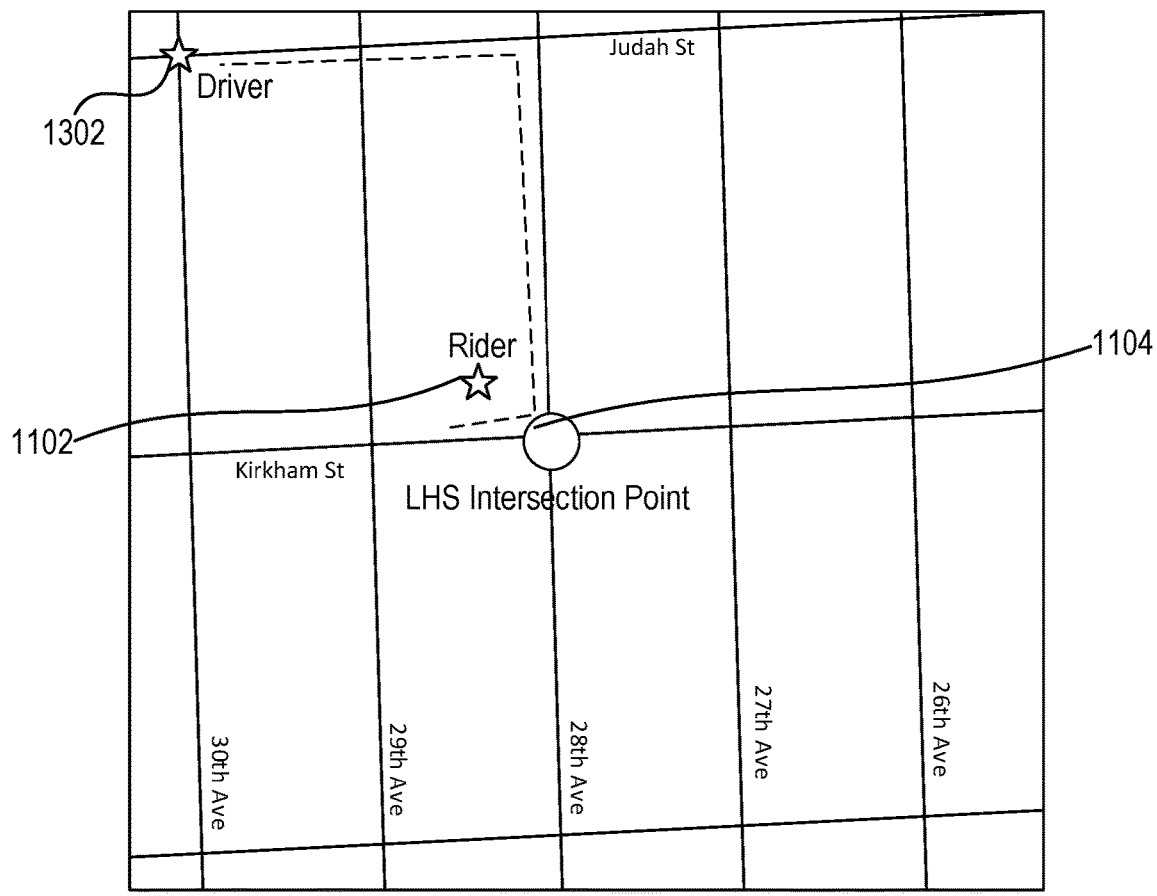
Figure 14:
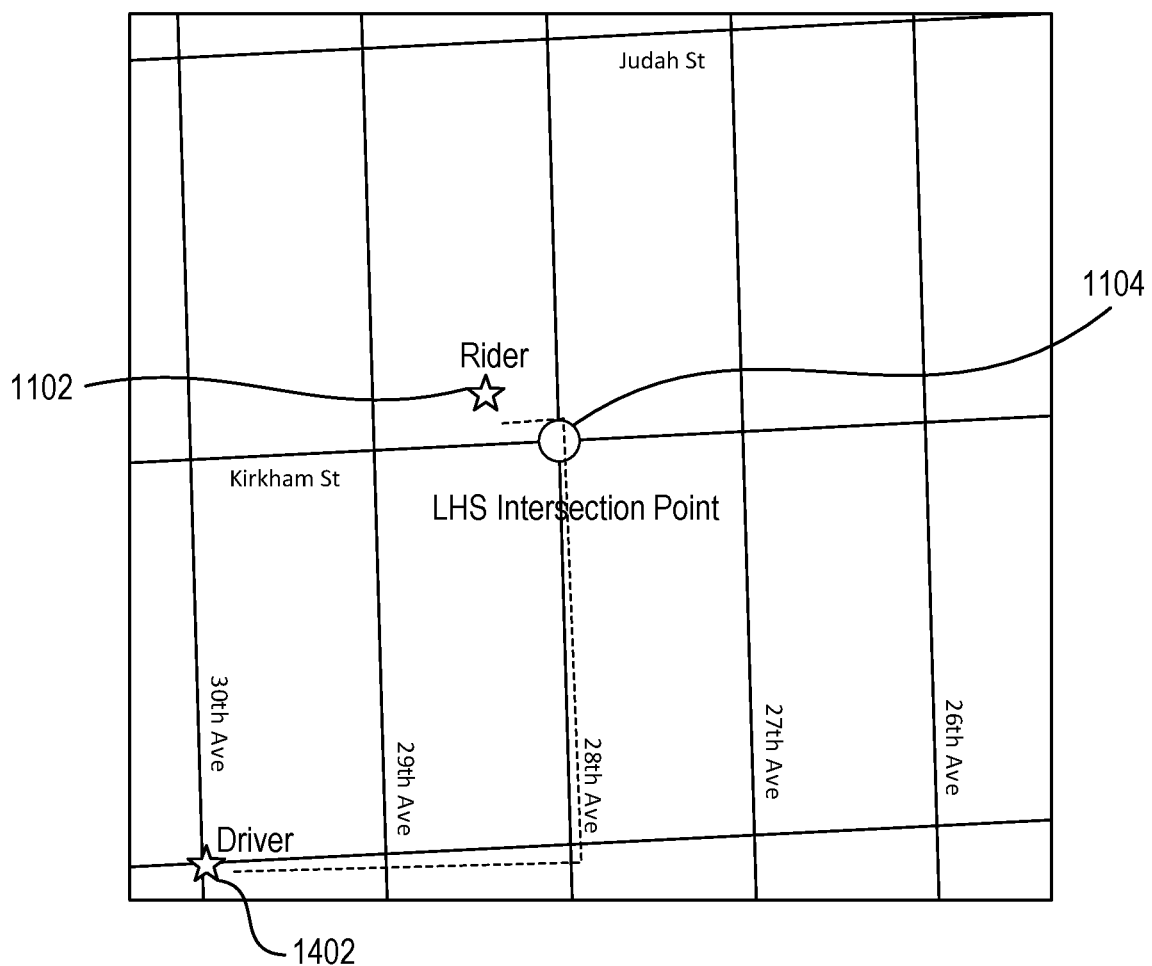
Figure 15:
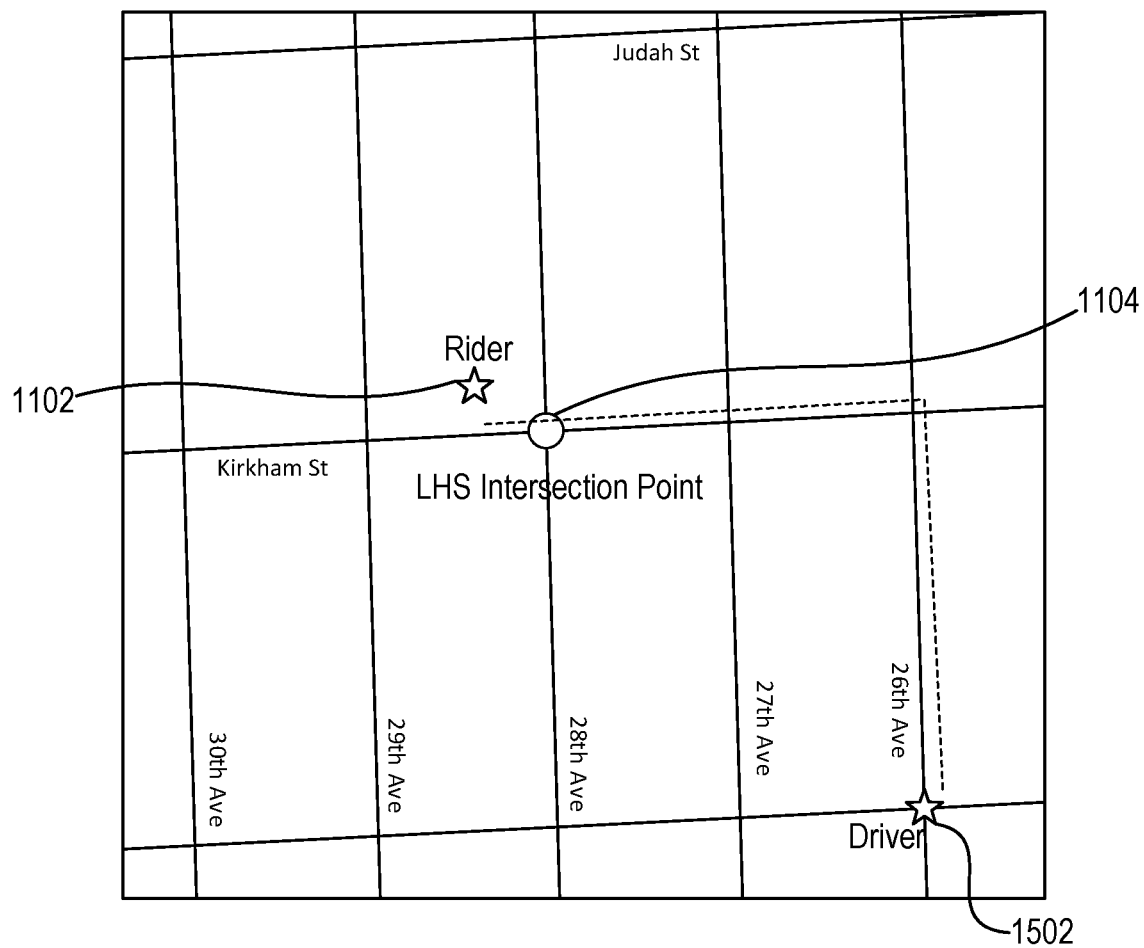

In the example shown in FIG. 11, there are several possible ways for a driver to reach the rider or destination location 1102. Irrespective of driver location, if a driver is directed via the nearest node 1104 (e.g., left-hand intersection point) linked to the rider or destination location 1102, the driver will arrive on the correct side of the street to pick up the rider safely. For example, FIGS. 12-15 show each of four possible routes by which the driver may be directed through the nearest node 1104 (e.g., left-hand intersection point). FIG. 12 illustrates an example map 1200 showing a start or driver location 1202 where the driver is routed via the nearest node 1104 (e.g., left-hand intersection point) to arrive on the correct side of the street for the rider or destination location 1102. FIG. 13 shows another example map 1300 showing a start or driver location 1302 where the driver is routed via the nearest node 1104 (e.g., left-hand intersection point) to arrive on the correct side of the street for the rider or destination location 1102. FIG. 14 illustrates a further example map 1400 showing a start or driver location 1402 where the driver is routed via the nearest node 1104 (e.g., left-hand intersection point) to arrive on the correct side of the street for the rider or destination location 1102. FIG. 15 shows another example map 1500 showing a start or driver location 1502 where the driver is routed via the nearest node 1104 (e.g., left-hand intersection point) to arrive on the correct side of the street for the rider or destination location 1102. All the scenarios in FIGS. 12-15 result in the passenger's door opening on the correct side of the street for the rider to enter the vehicle, as shown in FIG. 10.

Figure 16:
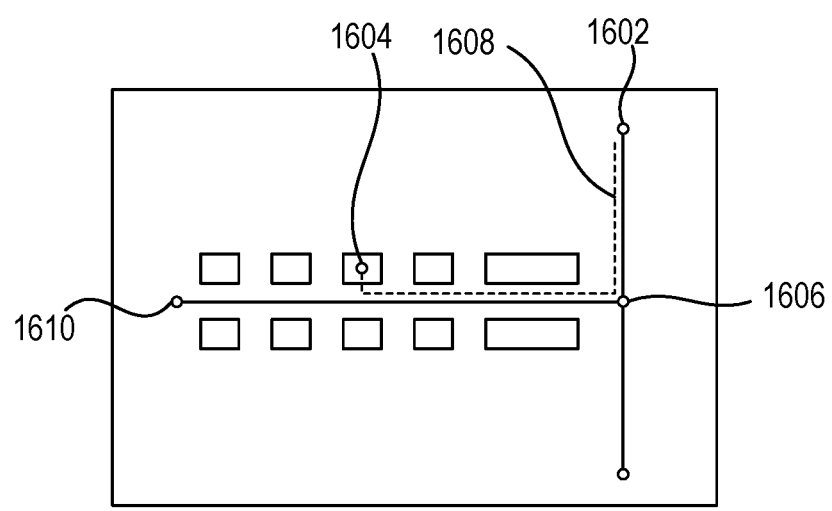
Figure 17:
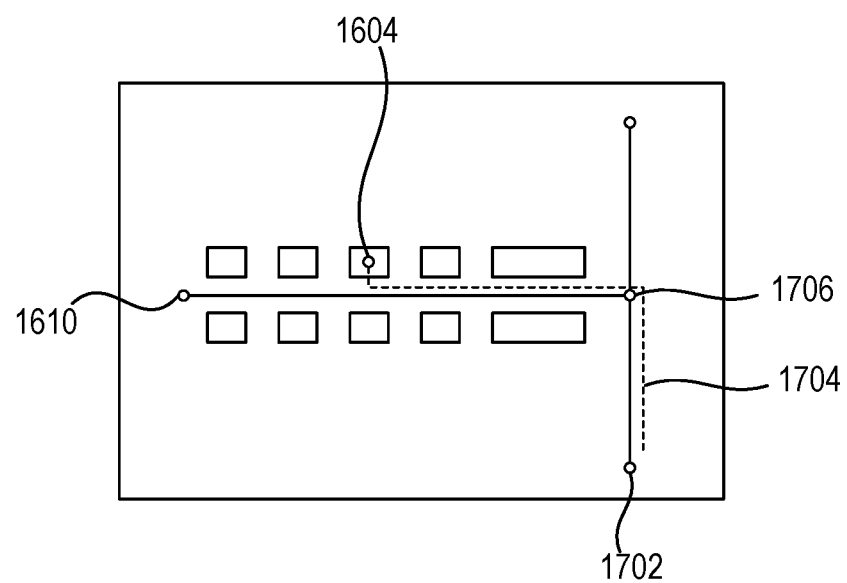

FIGS. 16-19 also illustrate a right-hand driving country scenario (e.g., where the driver location in the vehicle is typically on the left-hand side of the vehicle and vehicles drive on the right-hand side of the road), but in a scenario where the road segment is on a dead-end street (e.g., the destination location or rider location is on a dead-end street). FIG. 16 shows an example map 1600 where a destination location 1604 is on a dead-end street where the street dead ends at 1610. In this scenario, the node nearest the road segment of the destination location 1604 is the left-hand intersection 1606, and so the driver at the start location 1602 is routed (e.g., route 1608) via the left-hand intersection 1606 as in the scenarios described above. Likewise, FIG. 17 shows an example map 1700 with the same destination location 1604 on the dead-end street where the street dead ends at 1610 but with a different start location 1702. In this scenario, the node nearest the road segment of the destination location 1604 is also the left-hand intersection 1606, and so the driver at the start location 1702 is also routed (e.g., via a route 1704) via the left-hand intersection 1606 as in the scenarios described above.

Figure 18:
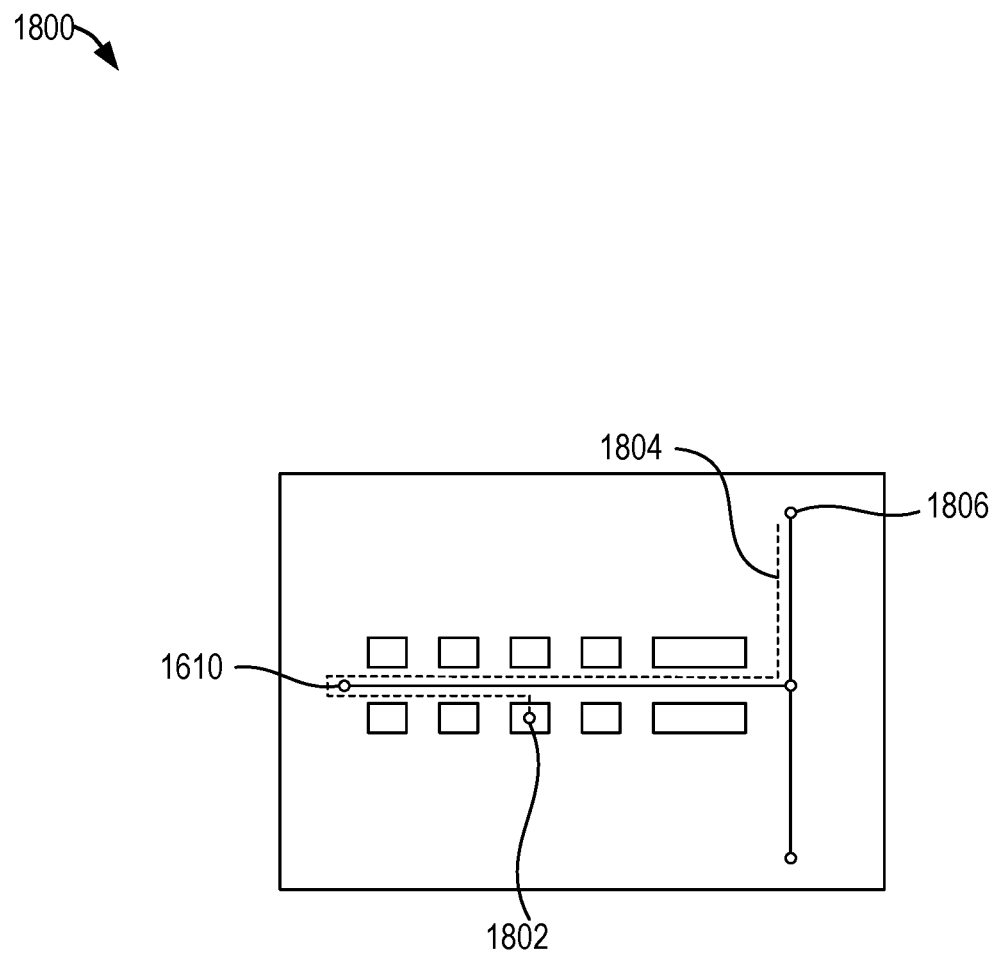
Figure 19:
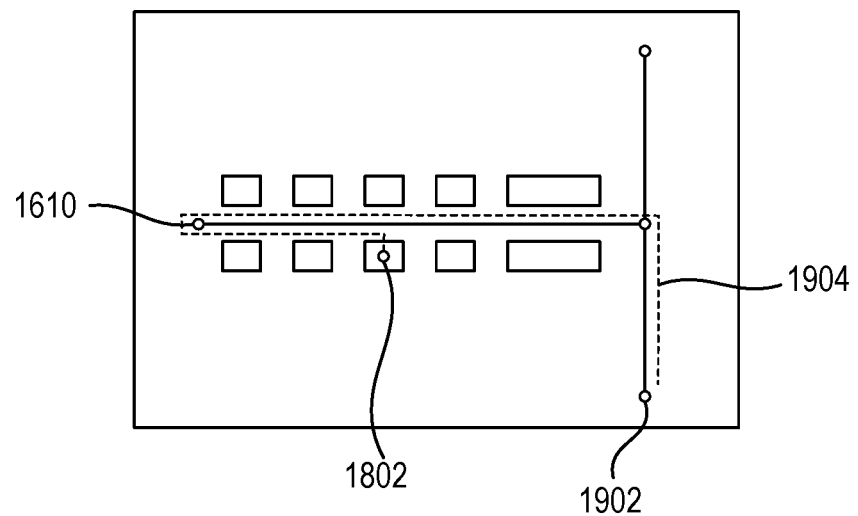

FIG. 18 shows an example map 1800 where a destination location 1802 is on the other side of the street (e.g., from the destination location 1604 in FIGS. 16-17). In this scenario, the node nearest the road segment of the destination location 1802 is the left-hand side node or dead-end node 1610 where the street dead ends. Thus, the driver at a start location 1806 is routed (e.g., via a route 1804) via the left-hand dead-end node 1610 (e.g., to make a U-turn) to the destination location 1802. Likewise, FIG. 19 shows an example map 1900 where the node nearest the destination location 1802 is the left-hand side node which is the dead-end node 1610 where the street dead ends. In this scenario the driver at a start location 1902 is also routed (e.g., via a route 1904) via the left-hand dead-end node 1610 (e.g., to make a U-turn) to the destination location 1802.

In one example, a user (e.g., a rider) may be at a location where there can be more than one pickup point. For example, the rider or destination location 502 of FIG. 5 could be either on Kirkham St or on 28th Ave. In this scenario, the computing system can automatically choose one of the options of pickup points as the destination location. For example, the computing system chooses one of the options based on the option that is the most common street as a destination location, the street with the easiest access, the most popular street, or based on one or more other criteria. In another example, the computing system can recommend the destination location to the user (e.g., cause the recommended location to be displayed to the user on a computing device associated with the user), or the computing system can ask the user to choose the destination location (e.g., cause a request for a selection of the destination location to be displayed to the user on the computing device). The computing system can thus use the computing system-chosen location, the recommended location, or the user-specified or user-requested location as the destination location.

The above examples are for a right-hand driving scenario. For a left-hand driving country scenario (e.g., where the driver location in the vehicle is typically on the right-hand side of the vehicle and vehicles drive on the left-hand side of the road), the nearest node to the right-hand side of the user (e.g., a nearest right-hand-side intersection) would be used to route the driver through to the destination location, in example embodiments.

Returning to FIG. 4, in operation 408, the computing system generates a first route from the start location to the node nearest the road segment corresponding to the destination location. For example, for the scenario in FIG. 6, the computing system generates a route from the start location or driver location 602 to the node 504. In one example, generating the first route from the start location to the node nearest the road segment corresponding to the destination location comprises generating navigational instructions from the start location to the node nearest the road segment corresponding to the destination location. The route can be generated using known or future mapping and navigation technologies, such as routing algorithms like Dijkstras Algorithm, Shortest Path Algorithm, AS Algorithm, or the like.

In operation 410, the computing system generates a second route from the node nearest the road segment corresponding to the destination location, to the destination location. For example, for the scenario in FIG. 6, the computing system generates a route from the node 504 to the rider or destination location 502. In one example, generating the second route comprises generating navigational instructions from the node nearest the road segment corresponding to the destination location to the destination location.

In operation 412, the computing system combines the first route and the second route to generate a final route. For example, the final route comprises a route from the start location, through the node nearest the road segment corresponding to the destination location, to the destination location. In one example, the final route comprises navigational instructions from the start location, through the node nearest the road segment corresponding to the destination location, to the destination location.

In one example embodiment, the computing system causes the final route to be displayed on a computing device (e.g., the computing device that made the request for navigation instructions, and/or another computing device). For example, the computing system sends the final route to the computing device, and the computing device displays the route, navigation instructions, and/or other related data on a display of the computing device. In one example, the computing device is a computing device associated with a driver located near the start location. In one example, the computing system causes the final route to be displayed on a second computing device associated with a rider located near the destination location.

In one example embodiment, the final route is one of several routes that may be selected as a final route to be used for navigation. For example, a system may select the final route to be used for navigation if the cost (in terms of time) is not too high relative to other possible routes, at least one of which may not result in an arrival on the same side of the road segment corresponding to the destination location as the final route. For instance, if the estimated time of arrival (ETA) to the destination location of the final route is not more than a predetermined threshold amount greater than one or more alternative routes, then the computing system would use the final route to provide to the computing device. If, however, the ETA to the destination location of the final route greater than at least one alternate route, the alternate route is chosen instead to be provided to the computing device. Thus, even though the alternate route may result in arrival on the opposite side of the street of a destination location (e.g., rider pickup location or rider drop-off location), the alternate route may be chosen based on the cost in terms of time.

In one example embodiment, the computing system determines an ETA to the destination location of the final route (the final route computed as described above with respect to the operations shown FIG. 4). This final route will be referred to in this example as the first final route. For example, the computing system may determine the ETA based on one or more of historical data, current traffic conditions, current weather conditions, or the like. In one example, a search or pathfinding algorithm is used to find a low cost route through the road network. For instance, individual travel costs of each of the segments of the route are added up to compute the ETA for that given route. It is to be understood that this method and/or other methods may be used in example embodiments to determine the ETA to the destination location of the first final route or final route.

The computing system generates at least one alternate route that does not result in an arrival on the same side of the road segment corresponding to the destination location as the first final route. In one example, the computing system generates an alternate route that would result in arrival on the opposite side of the street as the first final route. The computing system determines an ETA to the destination location of the alternate route. One alternate route is used here as an example, it is to be understood that multiple alternate routes can be generated and considered by the computing system.

The computing system determines whether the ETA of the destination location of the first final route is more than a predetermined threshold amount greater than the ETA of the at least one alternate route. In one example, the predetermined threshold amount may be a specified value in time, such as 3 or 5 minutes, as an example. In this example, the first final route (which results in arrival on the same side of street as the destination location) is selected if the ETA is not greater than 3 (or 5) minutes than an alternate route. In another example, the threshold amount may be a ratio, such as 5%, as an example. In this example, the first final route is selected if the ETA is not greater than 5% of an alternative route.

The computing system selects the at least one alternate route as the final route to be displayed on a computing device when it determines that the ETA to the destination location of the first final route is more than the predetermined threshold amount greater than the ETA of the at least one alternate route. For example, if the predetermined threshold amount is 3 minutes and the ETA of the first final route is 15 minutes and the ETA of the alternate route is 10 minutes, the alternate route is selected since the ETA of the first final route is 5 minutes more than the alternate route which is greater than the threshold amount of 3 minutes.

As described above, the computing system causes the final route (e.g., the selected alternate route) to be displayed on a computing device (e.g., the computing device that made the request for navigation instructions, and/or another computing device). For example, the computing system sends the final route to the computing device, and the computing device displays the route, navigation instructions, and/or other related data on a display of the computing device. In one example, the computing device is a computing device associated with a driver located near the start location. In one example, the computing system causes the final route to be displayed on a second computing device associated with a rider (e.g., located near the destination location or with the driver en route to the destination location).

The computing system selects the first final route as the final route when it determines that the destination location of the first final route is less than or equal to the predetermined threshold amount greater than the estimated time of arrival of the at least one alternate route. For example, if the predetermined threshold amount is 3 minutes and the ETA of the first final route is 13 minutes and the ETA of the alternate route is 10 minutes, the first final route is selected since the ETA of the first final route is 3 minutes more than the alternate route which is equal to the threshold amount of 3 minutes.

As described above, the computing system causes the final route (e.g., the selected first final route) to be displayed on a computing device (e.g., the computing device that made the request for navigation instructions, and/or another computing device). For example, the computing system sends the final route to the computing device, and the computing device displays the route, navigation instructions, and/or other related data on a display of the computing device. In one example, the computing device is a computing device associated with a driver located near the start location. In one example, the computing system causes the final route to be displayed on a second computing device associated with a rider (e.g., located near the destination location or with the driver en route to the destination location).

In the examples describe above, the start location and destination location are described as being received initially to request a route from the start location to the destination location. It is to be understood that the start location and destination location can also be received in response to determining a change in route of a vehicle navigating an initial route. For example, a vehicle may be following an initial route from a start location to a destination location and may change course based on one or more of traffic conditions, weather conditions, road closures, driver or rider preference for an alternate course, and so forth. The computing system detects that the vehicle has changed course from the initial route and can recalculate the final route (as shown in FIG. 4 and described above) and/or alternate routes as also described above to provide an updated final route.

Operations of example embodiments (e.g., operations shown in FIG. 4 and described for determining an alternate route) are described as being performed by a computing system, such as the server system 102 or the navigation system 124. It is to be understood that operations of example embodiments may be performed by a computing device (e.g., the client device 110) such as a rider computing device and/or a driver computing device, or a combination of a computing system and a computing device. For example, a computing device receives a start and destination location, determines a road segment corresponding to the destination location, identifies a node nearest the road segment corresponding to the destination location, generates a first route from the start location to the node nearest the road segment corresponding to the destination location, generates a second route from the node nearest the road segment corresponding to the destination location to the destination location, and combines the first route and the second route to generate a final route, and so forth as described in further detail above.

Figure 20:
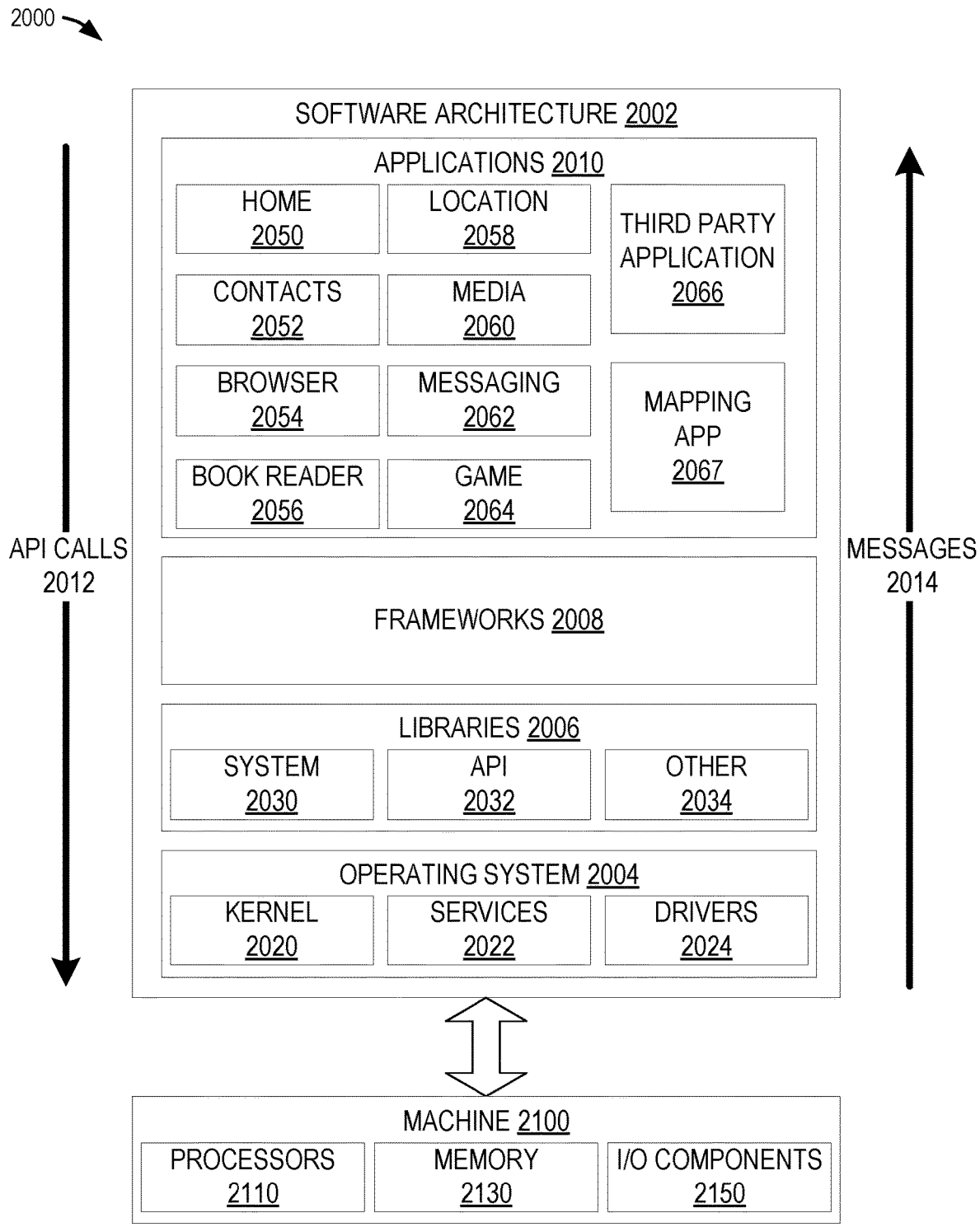
FIG. 20 is a block diagram illustrating an example of a software architecture that may be installed on a machine, according to some example embodiments.

FIG. 20 is a block diagram 2000 illustrating a software architecture 2002, which can be installed on any one or more of the devices described above. For example, in various embodiments, client devices 110 and servers and systems 130, 102, 120, 122, and 124 may be implemented using some or all of the elements of the software architecture 2002. FIG. 20 is merely a non-limiting example of a software architecture, and it will be appreciated that many other architectures can be implemented to facilitate the functionality described herein. In various embodiments, the software architecture 2002 is implemented by hardware such as a machine 2100 of FIG. 21 that includes processors 2110, memory 2130, and I/O components 2150. In this example, the software architecture 2002 can be conceptualized as a stack of layers where each layer may provide a particular functionality. For example, the software architecture 2002 includes layers such as an operating system 2004, libraries 2006, frameworks 2008, and applications 2010. Operationally, the applications 2010 invoke application programming interface (API) calls 2012 through the software stack and receive messages 2014 in response to the API calls 2012, consistent with some embodiments.

In various implementations, the operating system 2004 manages hardware resources and provides common services. The operating system 2004 includes, for example, a kernel 2020, services 2022, and drivers 2024. The kernel 2020 acts as an abstraction layer between the hardware and the other software layers, consistent with some embodiments. For example, the kernel 2020 provides memory management, processor management (e.g., scheduling), component management, networking, and security settings, among other functionality. The services 2022 can provide other common services for the other software layers. The drivers 2024 are responsible for controlling or interfacing with the underlying hardware, according to some embodiments. For instance, the drivers 2024 can include display drivers, camera drivers, BLUETOOTH® or BLUETOOTH® Low Energy drivers, flash memory drivers, serial communication drivers (e.g., Universal Serial Bus (USB) drivers), WIFI® drivers, audio drivers, power management drivers, and so forth.

In some embodiments, the libraries 2006 provide a low-level common infrastructure utilized by the applications 2010. The libraries 2006 can include system libraries 2030 (e.g., C standard library) that can provide functions such as memory allocation functions, string manipulation functions, mathematical functions, and the like. In addition, the libraries 2006 can include API libraries 2032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 2006 can also include a wide variety of other libraries 2034 to provide many other APIs to the applications 2010.

The frameworks 2008 provide a high-level common infrastructure that can be utilized by the applications 2010, according to some embodiments. For example, the frameworks 2008 provide various graphic user interface (GUI) functions, high-level resource management, high-level location services, and so forth. The frameworks 2008 can provide a broad spectrum of other APIs that can be utilized by the applications 2010, some of which may be specific to a particular operating system 2004 or platform.

In an example embodiment, the applications 2010 include a home application 2050, a contacts application 2052, a browser application 2054, a book reader application 2056, a location application 2058, a media application 2060, a messaging application 2062, a game application 2064, and a broad assortment of other applications, such as a third-party application 2066. According to some embodiments, the applications 2010 are programs that execute functions defined in the programs. Various programming languages can be employed to create one or more of the applications 2010, structured in a variety of manners, such as object-oriented programming languages (e.g., Objective-C, Java, or C++) or procedural programming languages (e.g., C or assembly language). In a specific example, the third-party application 2066 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 2066 can invoke the API calls 2012 provided by the operating system 2004 to facilitate functionality described herein.

Some embodiments may particularly include a mapping application 2067. In certain embodiments, this may be a standalone application that operates to manage communications with a server system such as third-party servers 130 or server system 102. In other embodiments, this functionality may be integrated with another application. The mapping application 2067 may request and display various data related to mapping and navigation and may provide the capability for a user 106 to input data related to the objects via a touch interface, via a keyboard, or using a camera device of the machine 2100, communication with a server system via the I/O components 2150, and receipt and storage of object data in the memory 2130. Presentation of information and user inputs associated with the information may be managed by the mapping application 2067 using different frameworks 2008, library 2006 elements, or operating system 2004 elements operating on the machine 2100.

Figure 21:
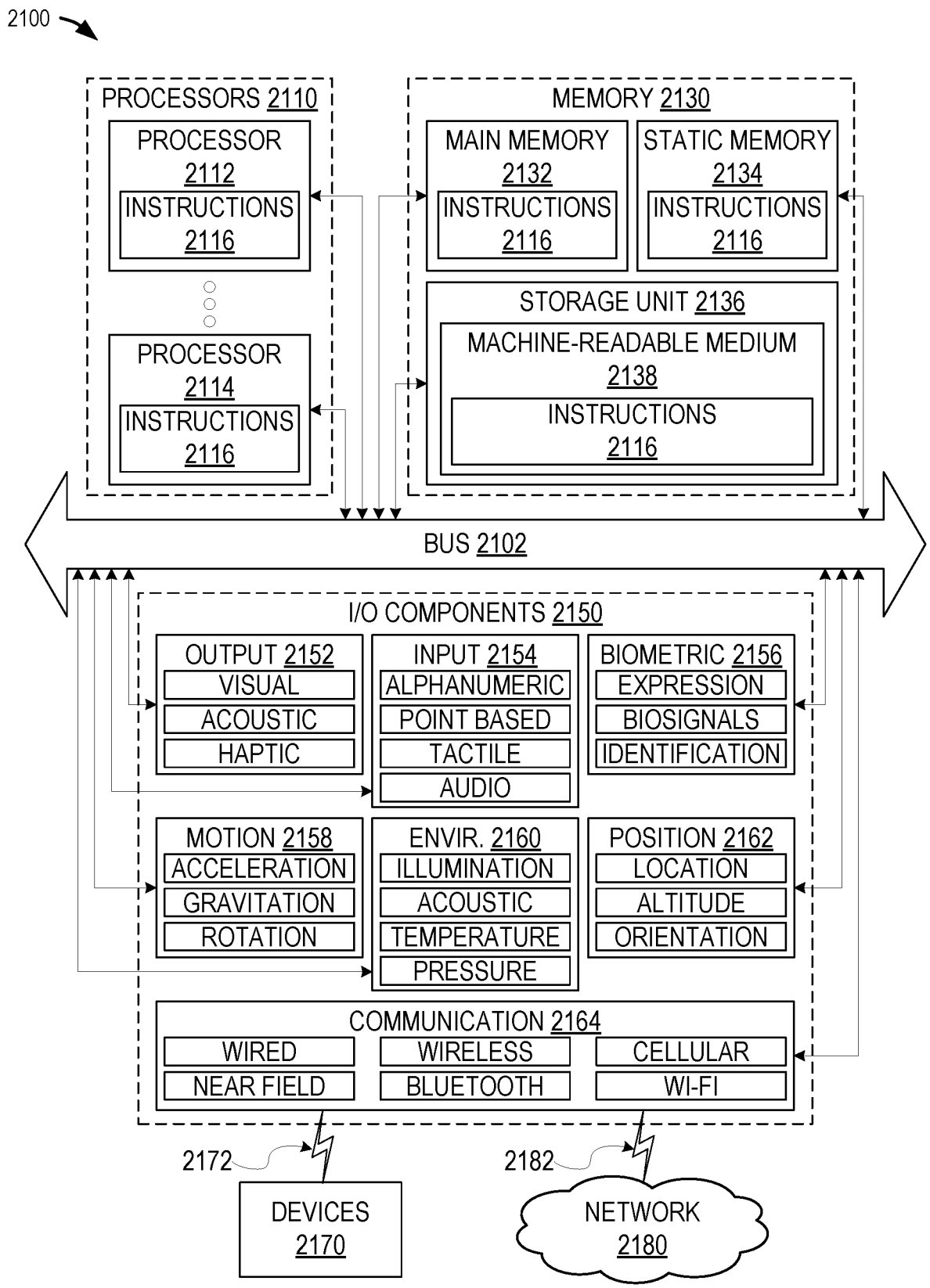
FIG. 21 illustrates a diagrammatic representation of a machine, in the form of a computer system, within which a set of instructions may be executed for causing the machine to perform any one or more of the methodologies discussed herein, according to an example embodiment.

FIG. 21 is a block diagram illustrating components of a machine 2100, according to some embodiments, able to read instructions from a machine-readable medium (e.g., a machine-readable storage medium) and perform any one or more of the methodologies discussed herein. Specifically, FIG. 21 shows a diagrammatic representation of the machine 2100 in the example form of a computer system, within which instructions 2116 (e.g., software, a program, an application 2010, an applet, an app, or other executable code) for causing the machine 2100 to perform any one or more of the methodologies discussed herein can be executed. In alternative embodiments, the machine 2100 operates as a standalone device or can be coupled (e.g., networked) to other machines. In a networked deployment, the machine 2100 may operate in the capacity of a server machine or system 130, 102, 120, 122, 124, etc., or a client device 110 in a server-client network environment, or as a peer machine in a peer-to-peer (or distributed) network environment. The machine 2100 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2116, sequentially or otherwise, that specify actions to be taken by the machine 2100. Further, while only a single machine 2100 is illustrated, the term "machine"

shall also be taken to include a collection of machines 2100 that individually or jointly execute the instructions 2116 to perform any one or more of the methodologies discussed herein.

In various embodiments, the machine 2100 comprises processors 2110, memory 2130, and I/O components 2150, which can be configured to communicate with each other via a bus 2102. In an example embodiment, the processors 2110 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 2112 and a processor 2114 that may execute the instructions 2116. The term "processor" is intended to include multi-core processors 2110 that may comprise two or more independent processors 2112, 2114 (also referred to as "cores") that can execute instructions 2116 contemporaneously. Although FIG. 21 shows multiple processors 2110, the machine 2100 may include a single processor 2110 with a single core, a single processor 2110 with multiple cores (e.g., a multi-core processor 2110), multiple processors 2112, 2114 with a single core, multiple processors 2112, 2114 with multiple cores, or any combination thereof.

The memory 2130 comprises a main memory 2132, a static memory 2134, and a storage unit 2136 accessible to the processors 2110 via the bus 2102, according to some embodiments. The storage unit 2136 can include a machine-readable medium 2138 on which are stored the instructions 2116 embodying any one or more of the methodologies or functions described herein. The instructions 2116 can also reside, completely or at least partially, within the main memory 2132, within the static memory 2134, within at least one of the processors 2110 (e.g., within the processor's cache memory), or any suitable combination thereof, during execution thereof by the machine 2100. Accordingly, in various embodiments, the main memory 2132, the static memory 2134, and the processors 2110 are considered machine-readable media 2138.

As used herein, the term "memory" refers to a machine-readable medium 2138 able to store data temporarily or permanently and may be taken to include, but not be limited to, random-access memory (RAM), read-only memory (ROM), buffer memory, flash memory, and cache memory. While the machine-readable medium 2138 is shown, in an example embodiment, to be a single medium, the term "machine-readable medium" should be taken to include a single medium or multiple media (e.g., a centralized or distributed database, or associated caches and servers) able to store the instructions 2116. The term "machine-readable medium" shall also be taken to include any medium, or combination of multiple media, that is capable of storing instructions (e.g., the instructions 2116) for execution by a machine (e.g., the machine 2100), such that the instructions, when executed by one or more processors of the machine (e.g., the processors 2110), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 2150 include a wide variety of components to receive input, provide output, produce output, transmit information, exchange information, capture measurements, and so on. In general, it will be appreciated that the I/O components 2150 can include many other components that are not shown in FIG. 21. The I/O components 2150 are grouped according to functionality merely for simplifying the following discussion, and the grouping is in no way limiting. In various example embodiments, the I/O components 2150 include output components 2152 and input components 2154. The output components 2152 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 2154 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touchscreen that provides location and force of touches or touch gestures, or other tactile input components), audio input components (e.g., a microphone), and the like.

In some further example embodiments, the I/O components 2150 include biometric components 2156, motion components 2158, environmental components 2160, or position components 2162, among a wide array of other components. For example, the biometric components 2156 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 2158 include acceleration sensor components (e.g., accelerometer), gravitation sensor components (e.g., gyroscope), and so forth. The environmental components 2160 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 2162 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 2150 may include communication components 2164 operable to couple the machine 2100 to a network 2180 or devices 2170 via a coupling 2182 and a coupling 2172, respectively. For example, the communication components 2164 include a network interface component or another suitable device to interface with the network 2180. In further examples, the communication components 2164 include wired communication components, wireless communication components, cellular communication components, near field communication (NFC) components, BLUETOOTH® components (e.g., BLUETOOTH® Low Energy), WI-FT® components, and other communication components to provide communication via other modalities. The devices 2170 may be another machine 2100 or any of a wide variety of peripheral devices (e.g., a peripheral device coupled via a Universal Serial Bus (USB)).

Moreover, in some embodiments, the communication components 2164 detect identifiers or include components operable to detect identifiers. For example, the communication components 2164 include radio frequency identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D barcodes, and other optical codes), acoustic detection components (e.g., microphones to identify tagged audio signals), or any suitable combination thereof. In addition, a variety of information can be derived via the communication components 2164, such as location via Internet Protocol (IP) geo-location, location via WI-FT® signal triangulation, location via detecting a BLUETOOTH® or NFC beacon signal that may indicate a particular location, and so forth.

In various example embodiments, one or more portions of the network 2180 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WIFI® network, another type of network, or a combination of two or more such networks. For example, the network 2180 or a portion of the network 2180 may include a wireless or cellular network, and the coupling 2182 may be a Code Division Multiple Access (CDMA) connection, a Global System for Mobile communications (GSM) connection, or another type of cellular or wireless coupling. In this example, the coupling 2182 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 2116 are transmitted or received over the network 2180 using a transmission medium via a network interface device (e.g., a network interface component included in the communication components 2164) and utilizing any one of a number of well-known transfer protocols (e.g., Hypertext Transfer Protocol (HTTP)). Similarly, in other example embodiments, the instructions 2116 are transmitted or received using a transmission medium via the coupling 2172 (e.g., a peer-to-peer coupling) to the devices 2170. The term "transmission medium" shall be taken to include any intangible medium that is capable of storing, encoding, or carrying the instructions 2116 for execution by the machine 2100, and includes digital or analog communications signals or other intangible media to facilitate communication of such software.

Furthermore, the machine-readable medium 2138 is non-transitory (in other words, not having any transitory signals) in that it does not embody a propagating signal. However, labeling the machine-readable medium 2138 "non-transitory" should not be construed to mean that the medium is incapable of movement; the machine-readable medium 2138 should be considered as being transportable from one physical location to another. Additionally, since the machine-readable medium 2138 is tangible, the machine-readable medium 2138 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method for generating a route in a navigation system to position a vehicle on a same side of a street as a rider desiring a ride in the vehicle, comprising:
determining that there is more than one option for a pickup point corresponding to a location of the rider;
causing a request for selection of one of a plurality of options for a destination location to be displayed on a computing device of the rider;
receiving, from the computing device of the rider, a selection of one of the plurality of options for the destination location and setting the selection of the one of the plurality of options as the destination location;
receiving, from a computing device of a driver, latitude and longitude coordinates for a start location;
determining a road segment corresponding to the destination location by determining a shortest distance from the destination location to a nearest road;
identifying a node nearest the road segment corresponding to the destination location, the node corresponding to a nearest node to the left of the rider when the rider is facing the nearest road at the destination location for a right-hand driving country or a nearest node to the right of the rider when the rider is facing the nearest road at the destination location for a left-hand driving country, wherein the node is an intersection, a cul-de-sac, a T junction, a crossroad, a Y junction, a roundabout, a slip road, or a braided road, the node nearest the road segment being identified to position a passenger door of the vehicle towards a sidewalk side of the road segment allowing the passenger door to be opened by the rider from the sidewalk side of the road segment where the rider is positioned;
generating navigational instructions from the start location to the node nearest the road segment corresponding to the destination location;
generating navigational instructions from the node nearest the road segment corresponding to the destination location, to the destination location;
combining, by one or more hardware processors, the navigational instructions from the start location to the node nearest the road segment corresponding to the destination location and the navigational instructions from the node nearest the road segment corresponding to the destination location to the destination location to generate a final route, the final route comprising navigational instructions from the start location, through the node nearest the road segment corresponding to the destination location, to the destination location; and
causing the final route comprising the navigational instructions from the start location, through the node nearest the road segment to the destination location, to be displayed on the computing device of the driver.

2. The method of claim 1, wherein the node nearest the road segment corresponding to the destination location is an intersection to the left when facing a street at the destination location for a right-hand driving country or an intersection to the right when facing a street at the destination location for a left-hand driving country.

3. The method of claim 1, wherein the node nearest the road segment corresponding to the destination location is a dead end.

4. The method of claim 1, wherein the node nearest the road segment corresponding to the destination location is a U-turn point.

5. The method of claim 1, wherein the start location is a driver location and the destination location is a rider location.

6. The method of claim 5, the method further comprising:
causing the final route to be displayed on the computing device of the rider.

7. The method of claim 1, wherein the final route is a first final route and further comprising:
determining an estimated time of arrival to the destination location of the first final route;
generating at least one alternate route that does not result in an arrival on the same side of the road segment corresponding to the destination location as the first final route;
determining an estimated time of arrival to the destination location of the at least one alternate route;
determining whether the estimated time of arrival to the destination location of the first final route is more than a predetermined threshold amount greater than the estimated time of arrival of the at least one alternate route;
selecting the at least one alternate route as the final route to be displayed on a computing device when the estimated time of arrival to the destination location of the first final route is more than the predetermined threshold amount greater than the estimated time of arrival of the at least one alternate route; and
selecting the first final route as the final route when the estimated time of arrival to the destination location of the first final route is less than or equal to the predetermined threshold amount greater than the estimated time of arrival of the at least one alternate route.

8. The method of claim 7, wherein the start location is received in response to determining a change in route of a vehicle navigating an initial route.

9. The computer-implemented method of claim 1, wherein the node nearest the road segment corresponding to the destination location is the intersection.

10. The computer-implemented method of claim 1, wherein the final route is a first final route and further comprising:
determining an estimated time of arrival to the destination location of the first final route;
generating at least one alternate route that does not result in an arrival on the same side of the road segment corresponding to the destination location as the first final route;
determining an estimated time of arrival to the destination location of the at least one alternate route;
determining whether the estimated time of arrival to the destination location of the first final route is more than a predetermined threshold amount greater than the estimated time of arrival of the at least one alternate route;
selecting the at least one alternate route as the final route to be displayed on a computing device when the estimated time of arrival to the destination location of the first final route is more than the predetermined threshold amount greater than the estimated time of arrival of the at least one alternate route; and selecting the first final route as the final route when the estimated time of arrival to the destination location of the first final route is less than or equal to the predetermined threshold amount greater than the estimated time of arrival of the at least one alternate route.

11. The method of claim 1, further comprising:
associating the road segment corresponding to the destination location and the node nearest the road segment.

12. The method of claim 11, wherein the road segment is a first road segment and further comprising:
receiving a second start location and a second destination location; and
determining a node nearest the first road segment.

13. The method of claim 1, further comprising:
automatically choosing an option of the plurality of options for the destination location as a recommended destination location based on the option being a most common street as the destination location, a street with easiest access, or a most popular street.

14. The method of claim 13, further comprising:
causing the recommended destination location to be displayed on the computing device of the rider.

15. The method of claim 13, further comprising:
setting the recommended destination location as the destination location.

16. The method of claim 1, further comprising:
receiving a request from the computing device of the rider for a ride in a vehicle from a second start location to a second destination location;
determining a landmark corresponding to the second destination location; and
generating a second final route from the start location, via a second node nearest a road segment corresponding to the landmark, to the second destination location, the second node corresponding to a nearest node to the left when the rider is facing a nearest road at the destination location for a right-hand driving country or a nearest node to the right when the rider is facing the nearest road at the destination location for a left-hand driving country.

17. A computing system for generating a route in a navigation system to position a vehicle on a same side of a street as a rider desiring a ride in the vehicle, comprising:
a memory that stores instructions; and
one or more processors configured by the instructions to perform operations comprising:
determining that there is more than one option for a pickup point corresponding to a location of the rider;
causing a request for selection of one of a plurality of options for a destination location to be displayed on a computing device of the rider;
receiving, from the computing device of the rider, a selection of one of the plurality of options for the destination location and setting the selection of the one of the plurality of options as the destination location;
receiving, from a computing device of a driver, latitude and longitude coordinates for a start location;
determining a road segment corresponding to the destination location by determining a shortest distance from the destination location to a nearest road;
identifying a node nearest the road segment corresponding to the destination location, the node corresponding to a nearest node to the left when the rider is facing the nearest road at the destination location for a right-hand driving country or a nearest node to the right when the rider is facing the nearest road at the destination location for a left-hand driving country, wherein the node is an intersection, a cul-de-sac, a T junction, a crossroad, a Y junction, a roundabout, a slip road, or a braided road, the node nearest the road segment being identified to position a passenger door of the vehicle towards a sidewalk side of the road segment allowing the passenger door to be opened by the rider from the sidewalk side of the road segment where the rider is positioned;
generating navigational instructions from the start location to the node nearest the road segment corresponding to the destination location;
generating navigational instructions from the node nearest the road segment corresponding to the destination location, to the destination location;
combining the navigational instructions from the start location to the node nearest the road segment corresponding to the destination location and the navigational instructions from the node nearest the road segment corresponding to the destination location to the destination location to generate a final route, the final route comprising navigational instructions from the start location, through the node nearest the road segment corresponding to the destination location, to the destination location; and
causing the final route comprising the navigational instructions from the start location, through the node nearest the road segment to the destination location, to be displayed on the computing device of the driver.

18. The computing system of claim 17, wherein the start location is received in response to determining a change in route of a vehicle navigating an initial route.

19. A non-transitory computer-readable medium comprising instructions stored thereon that are executable by at least one processor to cause a computing system to generate a route in a navigation system to position a vehicle on a same side of a street as a rider desiring a ride in the vehicle by performing operations comprising:
determining that there is more than one option for a pickup point corresponding to a location of the rider;
causing a request for selection of one of a plurality of options for a destination location to be displayed on a computing device of the rider;
receiving, from the computing device of the rider, a selection of one of the plurality of options for the destination location and setting the selection of the one of the plurality of options as the destination location;
receiving, from a computing device of a driver, latitude and longitude coordinates for a start location;
determining a road segment corresponding to the destination location by determining a shortest distance from the destination location to a nearest road;
identifying a node nearest the road segment corresponding to the destination location, the node corresponding to a nearest node to the left when the rider is facing the nearest road at the destination location for a right-hand driving country or a nearest node to the right when the rider is facing the nearest road at the destination location for a left-hand driving country, wherein the node is an intersection, a cul-de-sac, a T junction, a crossroad, a Y junction, a roundabout, a slip road, or a braided road, the node nearest the road segment being identified to position a passenger door of the vehicle towards a sidewalk side of the road segment allowing the passenger door to be opened by the rider from the sidewalk side of the road segment where the rider is positioned;

generating navigational instructions from the start location to the node nearest the road segment corresponding to the destination location;

generating navigational instructions from the node nearest the road segment corresponding to the destination location, to the destination location;

combining the navigational instructions from the start location to the node nearest the road segment corresponding to the destination location and the navigational instructions from the node nearest the road segment corresponding to the destination location to the destination location to generate a final route, the final route comprising navigational instructions from the start location, through the node nearest the road segment corresponding to the destination location, to the destination location; and causing the final route comprising the navigational instructions from the start location, through the node nearest the road segment to the destination location, to be displayed on the computing device of the driver.

* * * * *